(12) United States Patent
Aboumalwa

(10) Patent No.: US 11,428,363 B2
(45) Date of Patent: Aug. 30, 2022

(54) GRILLAGE APPARATUS AND METHOD OF USING AND MAKING SAME

(71) Applicant: Lamprell Energy Ltd., Douglas (IM)

(72) Inventor: Mohamed Kamel Taha Ahmed Aboumalwa, Alexandria Governate (EG)

(73) Assignee: Lamprell Energy Lt., Douglas (IM)

( * ) Notice: Subject to any disclaimer, the term of this patent is extended or adjusted under 35 U.S.C. 154(b) by 185 days.

(21) Appl. No.: 16/540,847

(22) Filed: Aug. 14, 2019

(65) Prior Publication Data

US 2020/0056740 A1 Feb. 20, 2020

Related U.S. Application Data

(60) Provisional application No. 62/718,676, filed on Aug. 14, 2018.

(51) Int. Cl.
*F16M 11/22* (2006.01)
*B60P 7/06* (2006.01)
(Continued)

(52) U.S. Cl.
CPC ............... *F16M 11/22* (2013.01); *B60P 7/06* (2013.01); *B63B 25/28* (2013.01);
(Continued)

(58) Field of Classification Search
CPC . F16M 11/22; B60P 7/06; B23B 25/28; F03D 13/20; F03D 13/25; E02D 13/08;
(Continued)

(56) References Cited

U.S. PATENT DOCUMENTS

| 4,094,558 A | 6/1978 | Christiansen |
| 4,172,680 A | 10/1979 | Brown |

(Continued)

FOREIGN PATENT DOCUMENTS

| CN | 1685147 A | 10/2005 |
| CN | 106759352 A | 5/2017 |

(Continued)

OTHER PUBLICATIONS

International Search Report, PCT/IB2019/056897, dated Dec. 18, 2019.

(Continued)

*Primary Examiner* — Tan Le
(74) *Attorney, Agent, or Firm* — Boyle Fredrickson, S.C.

(57) ABSTRACT

The present invention discloses a portable and re-useable grillage (100) for receiving and supporting a heavy load during transportation as well as methods of making and using same. The grillage (100) comprising a base (3); a load bearing structure (4) coupled to the base (3), the load bearing structure (4) is used for supporting the heavy load; and a framework (5) attached to the load bearing structure (4). The grillage (100) is containerized such that the combination of the base (3), load bearing structure (4) and the framework (5) forming the grillage has external dimensions and weight that conforms with ISO specifications for an intermodal container. The containerized grillage (100) may be used with different sized legs for different sized heavy loads. It may also be shipped in a vertical stacked formation using cost-effective standard shipping for containers.

17 Claims, 19 Drawing Sheets
(2 of 19 Drawing Sheet(s) Filed in Color)

(51) Int. Cl.
  *B63B 25/28* (2006.01)
  *E02D 5/70* (2006.01)
  *F03D 13/20* (2016.01)
  *E02D 27/42* (2006.01)
  *E02B 17/00* (2006.01)
  *E02D 5/72* (2006.01)

(52) U.S. Cl.
  CPC .............. *E02B 2017/0056* (2013.01); *E02B 2017/0073* (2013.01); *E02D 5/72* (2013.01); *E02D 27/425* (2013.01); *F03D 13/20* (2016.05); *Y02E 10/727* (2013.01)

(58) Field of Classification Search
  CPC ....... E02D 5/72; E02D 27/425; B65D 88/121; E02B 2017/0073; E02B 2017/0056; Y02E 10/727; Y02P 70/50
  See application file for complete search history.

(56) References Cited

U.S. PATENT DOCUMENTS

| | | | |
|---|---|---|---|
| 5,461,647 | A | 10/1995 | Clark et al. |
| 5,622,015 | A | 4/1997 | Collins |
| 6,027,287 | A | 2/2000 | Faldini |
| 6,352,388 | B1 | 3/2002 | Seguin |
| 8,708,604 | B2 | 4/2014 | Luo et al. |
| 8,863,455 | B2 | 10/2014 | Cariaga et al. |
| 9,045,877 | B2 | 6/2015 | Martigli |
| 9,096,985 | B1 * | 8/2015 | Phuly .................... E02B 17/025 |
| 9,194,095 | B2 | 11/2015 | Cariaga et al. |
| 9,499,954 | B2 * | 11/2016 | Shi .......................... E02D 27/42 |
| 9,562,367 | B2 * | 2/2017 | Chaput ................. E04H 12/344 |
| 9,810,204 | B2 * | 11/2017 | Aubault .................. B63B 39/03 |
| 9,938,685 | B2 | 4/2018 | Krause |
| 10,676,889 | B2 * | 6/2020 | Corella ................. E02D 27/425 |
| 10,920,443 | B2 * | 2/2021 | Rabaut .................. E04H 12/085 |
| 10,995,512 | B1 * | 5/2021 | Neighbor .............. E04H 12/344 |
| 2002/0017068 | A1 | 2/2002 | Monachino |
| 2006/0013689 | A1 | 1/2006 | Wobben |
| 2013/0326970 | A1 * | 12/2013 | Prass ...................... E02D 27/42 52/169.1 |

FOREIGN PATENT DOCUMENTS

| | | | |
|---|---|---|---|
| DE | 10245078 | A1 | 4/2004 |
| DE | 102013014686 | A1 | 3/2015 |
| WO | WO-2014060650 | A2 * | 4/2014 ......... E02B 17/0021 |
| WO | 2014/137296 | A1 | 9/2014 |

OTHER PUBLICATIONS

Written Opinion of the International Searching Authority, PCT/IB2019/056897, dated Dec. 19, 2019.
First Office Action for Application No. 2019800540068 dated dated Nov. 22, 2021, 9 pages.
Search Report for Application No. 2019800540068, 3 pages.

* cited by examiner

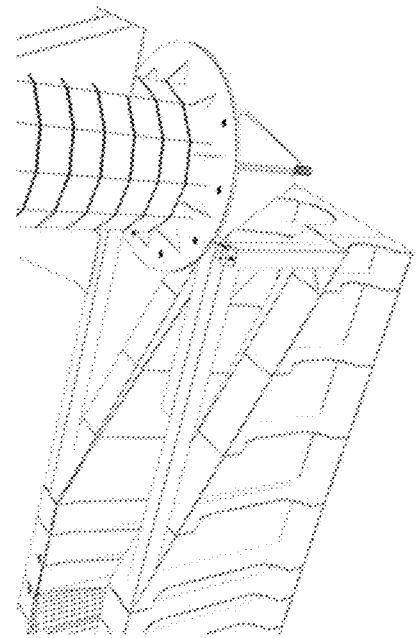
FIG. 6C
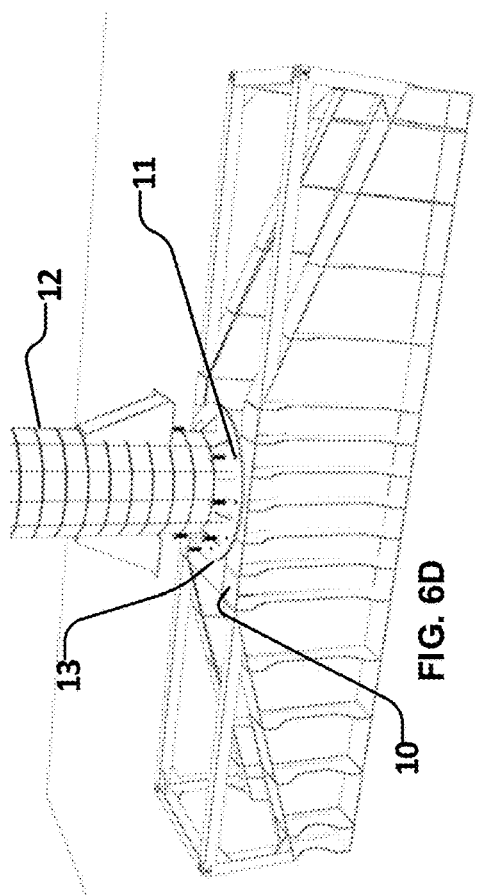
FIG. 6D
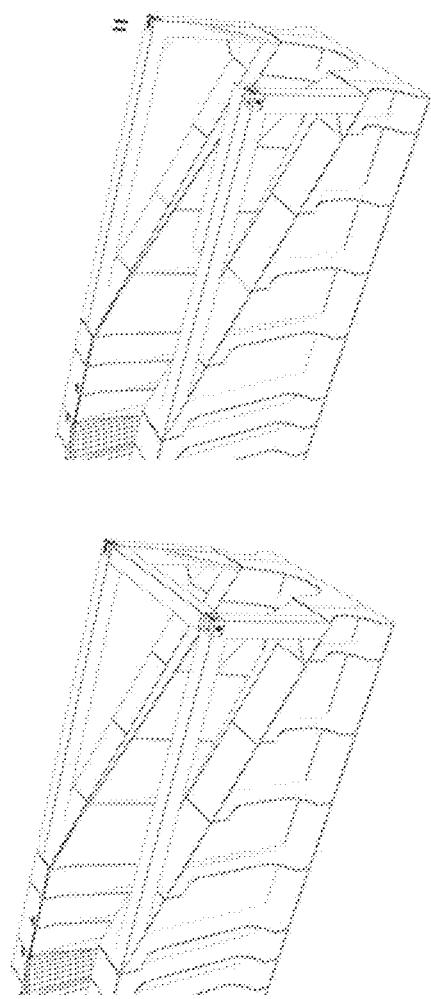
FIG. 6B
FIG. 6A
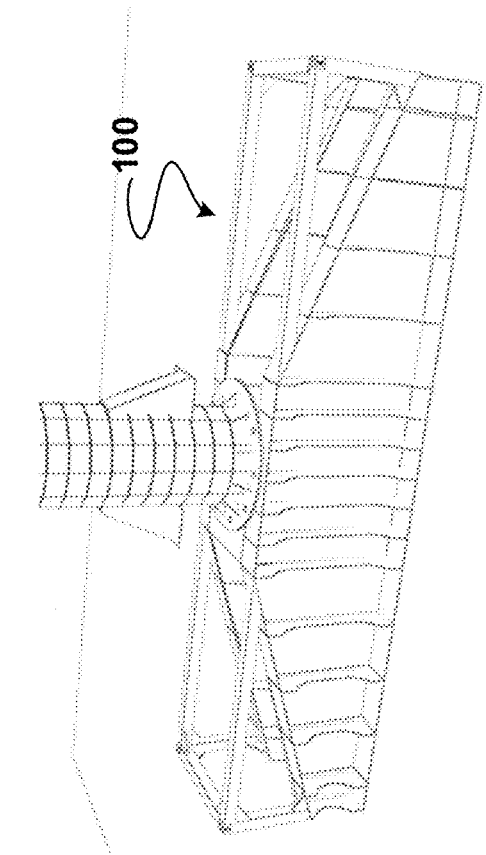
FIG. 6E

GRILLAGE APPARATUS AND METHOD OF USING AND MAKING SAME

CROSS-REFERENCED TO RELATED APPLICATIONS

This application is a non-provisional application claiming priority to U.S. Provisional Application No. 62/718,676 entitled "Grillage Apparatus and Method of Using and Making Same" and filed on Aug. 14, 2018, the entire content of which is incorporated herein by reference.

TECHNICAL FIELD OF THE INVENTION

This invention relates generally to load distribution management of various types of steel structures and more specifically to a grillage apparatus and method of using and making same.

BACKGROUND OF THE INVENTION

Traditionally, a grillage is used to distribute the concentrated loads of heavy structure, such as offshore substructures of windmills/oil platforms (i.e. jackets, spars, etc.) and Topsides for example, on a wider area of structure/ground supporting it. The grillage is mainly required because of relatively lower bearing capacity of support structure to the heavy concentrated forces.

Usually, a grillage may be assembled at the location where it is intended to be used or it may be prefabricated at a different location and transported to the site of actual use. Examples of such grillage foundations are described in US 2002/0017068 and U.S. Pat. No. 9,194,095. Whether the grillage is assembled in-situ or at a different location, the grillage is normally purpose built and is suitable only for specific configuration of supported & support structure. This limitation causes the requirement that the specification of the structure be provided in advance to allow for the making of the grillage foundation for supporting such structure.

The shape of the grillage foundations known in the art are unique to the structures which they are intended to support. Usually, such grillages are not of standard size shape or weight. When the grillage foundation is fabricated at a different location from the one at which it is intended to be used, the parts of the grillage foundation is usually fabricated at site or sometimes shipped in separate pieces to be assembled on site. Both fabrication and assembly methodology lead to substantial costs incurred for shipping heavy and irregularly shaped objects as well as labour costs for assembling same.

The grillage can be built for either a single operation for the specific structure or for multiple operations, where it may be used more than once to support substantially similar or identical structures. Once assembled and in case the grillage is meant for multiple uses, it has to be transported back to its origin or the location of its next use. Conventionally, this involves the transportation of the entire grillage structure as a whole. This transportation is costly because of several reasons. One reason is that the grillages are typically not of standard size, shape or weight and hence do not fit in to standard international carrier parameters. In such cases the grillage transportation has to be done on a special carrier intended to carry only the grillage or as break bulk cargo.

This can be cost effective in cases where the same carrier is intended to repeat the operation and hence anyway has to come back to its origin or location of next use. However, in other cases where the carrier is not expected to repeat the operation, bringing back the grillage to its origin or to the location of its next use might be costly prohibitive.

The removal of grillage and disassembling of parts to allow the grillage to be shipped back by another carrier, where the original carrier is not intended to return back to the fabrication site where grillage was supplied, involves as well a significant cost for disassembling the grillage and shipping back.

The disassembling/removal of grillage usually occurs in offshore/on-shore yards where access for carrier different from container carrier is limited. This creates difficulty in shipping back the grillage parts and ultimately leads to scrapping the grillage.

Therefore, there is a desire in the field to develop a grillage apparatus and a method of or making and using same to address and overcome the abovementioned problems in the prior art.

SUMMARY OF THE INVENTION

The present invention addresses the shortcomings in the prior art by designing a grillage with standardize size, shape & weight. Most importantly these parameters are kept within the limits of ISO containers so that the grillage can be transported using any standard container carrier. If need arises, the grillage can be attached to the bottom support structure.

The current disclosure has several aspects. In one aspect of the invention, a portable and re-useable grillage is described. The grillage is used for receiving and supporting a heavy load in a stationary position or during transportation. The grillage comprising a base, a load bearing structure coupled to the base. The load bearing structure is for supporting the heavy load. The grillage also comprises a framework attached to the load bearing structure. The grillage is characterized in that: the grillage is containerized and such that the combination of the base, the load bearing structure and the framework forming the grillage has external dimensions and weight that conforms with ISO specifications for an intermodal container.

In a related embodiment, the grillage is further characterized in that: the load bearing structure comprises a plurality of plates configured to be substantially parallel and spaced apart from one another along a longitudinal direction of the grillage. The plurality of plates are oriented to be substantially orthogonal to the base and facing the longitudinal direction of the grillage. The grillage further comprises a connecting structure for connecting the plurality of plates to form a unitary structure.

In a related embodiment, the grillage is further characterized in that: each plate of the plurality of plates having a recess such that in a vertical configuration, the recess in the plurality of plates forms a hollow structure extending along the longitudinal direction of the load bearing structure from a side along its longitudinal direction to a center section of the load bearing structure. The hollow structure is dimensioned to allow a male end member of a leg of a jacket structure to pass from the side of the grillage along its longitudinal direction and be received at the center section of the load bearing structure.

In a related embodiment, the grillage is further characterized in that: the grillage further comprises a horizontal plate resting on and fixed to part of the plurality of plates forming the center section, the horizontal plate oriented to be parallel to the base, the horizontal plate having a recess facing the side of the grillage along its longitudinal direction, the recess of the horizontal plate allowing the male end member of the leg of the jacket structure to be received and releasably secured at the center section of the load bearing structure.

In yet another related embodiment, the grillage is characterized in that: the grillage further comprises an adapter releasably secured to the grillage. The adapter is used for adapting different sized jacket structures to be supported by the grillage. In some embodiments, the adapter may be configured to support a substantially vertical object such as a leg of a heavy object. In other embodiments, the adapter may be configured to support a horizontally oriented object such as a beam acting as a base of a heavy object.

In yet another related embodiment, the grillage is characterized in that the plurality of plates are of different sizes such that the plurality of plates have heights that taper from the center section to the side of the load bearing structure along its longitudinal direction.

In another embodiment, the grillage is characterized in that: the grillage is transportable using standard container shipping means in at least one of vertical or horizontal stackable configuration of multiple containerized grillages.

In a related embodiment, the grillage is characterized in that the grillage further having corner blocks on each of its edges. The corner blocks are configured for releasably securing the base to a deck of a vessel during transportation and for releasably securing the multiple containerized grillages in the at least one of vertical or horizontal stackable configuration.

In another aspect of the invention, a method of making a grillage is described. In such method, the grillage is containerized and the steps of making the containerized grillage comprise: providing metallic plates; cutting the metallic plates to form recesses therein; configuring and orienting the metallic plates to be assembled together such that the metallic plates form an elongated structure that conforms with ISO specifications for an intermodal container, where the assembled elongated structure have a hollow section therein formed by the recesses of the metallic plates. The method further comprises bonding the metallic plates together using any one of bonding structures comprising plates or beams; attaching a frame composed of additional plating or beams to allow the assembled metallic plates to have dimensions including size, peripheral shape and weight conforming with those of an ISO intermodal container.

In a related embodiment, the method of making the grillage is characterized in that the method further comprises the step of cutting the metallic plates such that the plates have different sizes and different recess sizes, such that when the plates are assembled, the elongated structure formed by the assembled plates will have a central section taller in vertical height than either end of the assembled structure along its longitudinal axis and the height of the assembled structure from the plate is tapered from the central section to the either end of the assembled structure along its longitudinal axis.

In another aspect of the invention, a method of using a re-usable and portable grillage for transporting a heavy load on a vessel is described. The method is characterized in having the steps of: providing a plurality of containerized grillages as described above. The plurality of the containerized grillages correspond to a number of legs for the heavy load to be supported. The plurality of containerized grillages is positioned and configured on a deck of the vessel to correspond to a spacing and configuration of the legs for the heavy load. The method further comprises releasably securing the containerized grillages to the deck of the vessel; loading each leg of the number of legs onto a centre section of a corresponding containerized grillage; and releasably securing the legs onto their corresponding containerized grillage.

In a related embodiment, the method of using the grillage is further characterized in having the steps of using the plurality of containerized grillages for transporting a second heavy load, different from the heavy load in shape, weight and size by fitting one of the containerized grillage or legs of the second heavy load with an adapter.

In a related embodiment, the method of using the grillage is characterized in that the method further comprises the step of disassembling the containerized grillages after use and shipping them in a cost-effective stacked configuration using standard size container shipping. The stacking may be done either horizontally or vertically. The grillages may be stacked against one another or may be stacked against regular containers of the same size.

In a related method of using the grillage, the method is characterized in that the method further comprises the steps of securing the stacked configuration of the containerized grillages to one another by using twist locks at a corner block mounted on at least one corner of the containerized grillages.

In another aspect of the invention, a structure permanently fixed to a yard ground for supporting a heavy stationary load is described. The structure is characterized in having: a base; and a load bearing structure coupled to the base, the load bearing structure having two opposing plates substantially parallel to one another, extending along a longitudinal axis and oriented to be protruding, at least at a centre section, from and normal to the base, the centre section dimensioned to ejectably receive and support a male member of a leg of the stationary load.

Other aspects of the invention will be apparent as will be shown in the detailed description of the invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings illustrate non-limiting example embodiments of the invention.

FIG. 6A to FIG. 6E shows a method of loading a leg of a jacket onto the grillage shown in FIG. 1.

DETAILED DESCRIPTION

Throughout the following description specific details are set forth in order to provide a more thorough understanding to persons skilled in the art. However, well known elements may not have been shown or described in detail to avoid unnecessarily obscuring the disclosure. The following description of examples of the technology is not intended to be exhaustive or to limit the system to the precise forms of any example embodiment. Accordingly, the description and drawings are to be regarded in an illustrative, rather than a restrictive, sense. Elements that are repeated in multiple drawings are understood to have the same numbering and are not necessarily labelled on each of the drawings.

Figure 1:
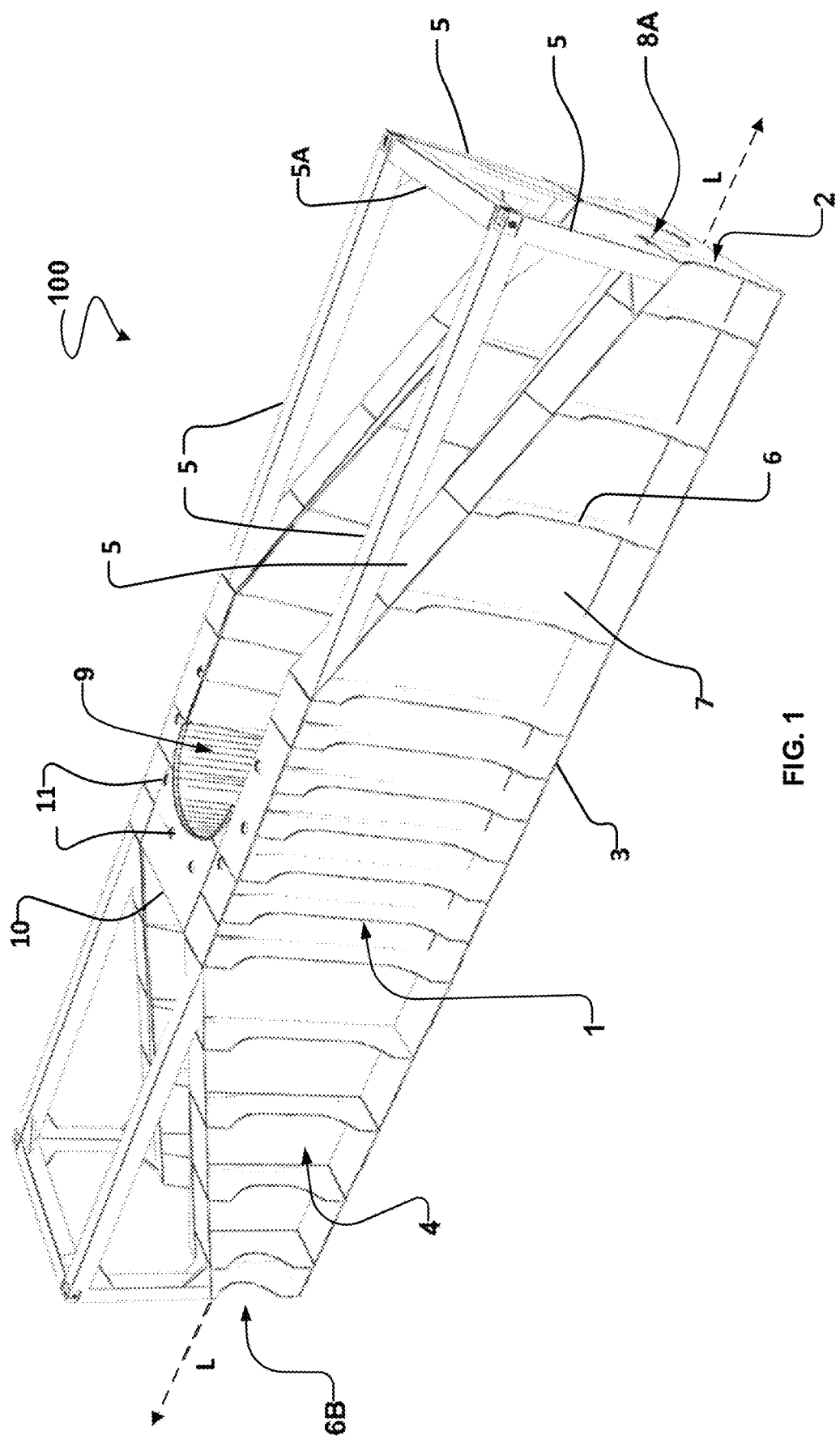
FIG. 1 shows a perspective view of a grillage according to an embodiment of the present invention.

The embodiment covered by FIG. 1 to FIG. 5 will be herein described. FIG. 1 shows a perspective view of a grillage apparatus 100 according to an exemplary embodiment of the current invention. In FIG. 1, grillage 100 is containerised. For the purpose of this disclosure, the term containerised is to be understood as to have a shape, external dimensions and not to exceed gross weight comparable to that of an intermodal container, which conforms to International Organization of Standardization (ISO) specifications. Grillage 100 is shown to have two opposing and parallel sides 1 along its longitudinal axis L (hereinafter referred to as the major sides 1) and two opposing and parallel sides 2 normal to the plane of the longitudinal axis L (hereinafter referred to as the minor sides 2).

Grillage 100 is shown to have a base 3 and a solid section 4 forming a load bearing structure fixable on base 3 for receiving and supporting a heavy structure. Grillage 100 is also shown to have a framework coupled to the solid section 4 and is configured to allow the grillage to have the containerised specification. In the embodiment presented in FIG. 1, the load bearing structure is permanently fixed to the base 3 of the containerised grillage 100. In other embodiments, base 3 is formed as integral part of solid section 4 of grillage 100.

The solid section 4, base 3 and framework 5 may be made from steel or different types of metals known in the art for manufacturing intermodal containers. The components of grillage 100 may also be made from hard material other than metals known in the art for making intermodal containers or known for stability and weight bearing qualities. By way of non-limiting example, such material may be reinforced polymers.

Figure 1A:
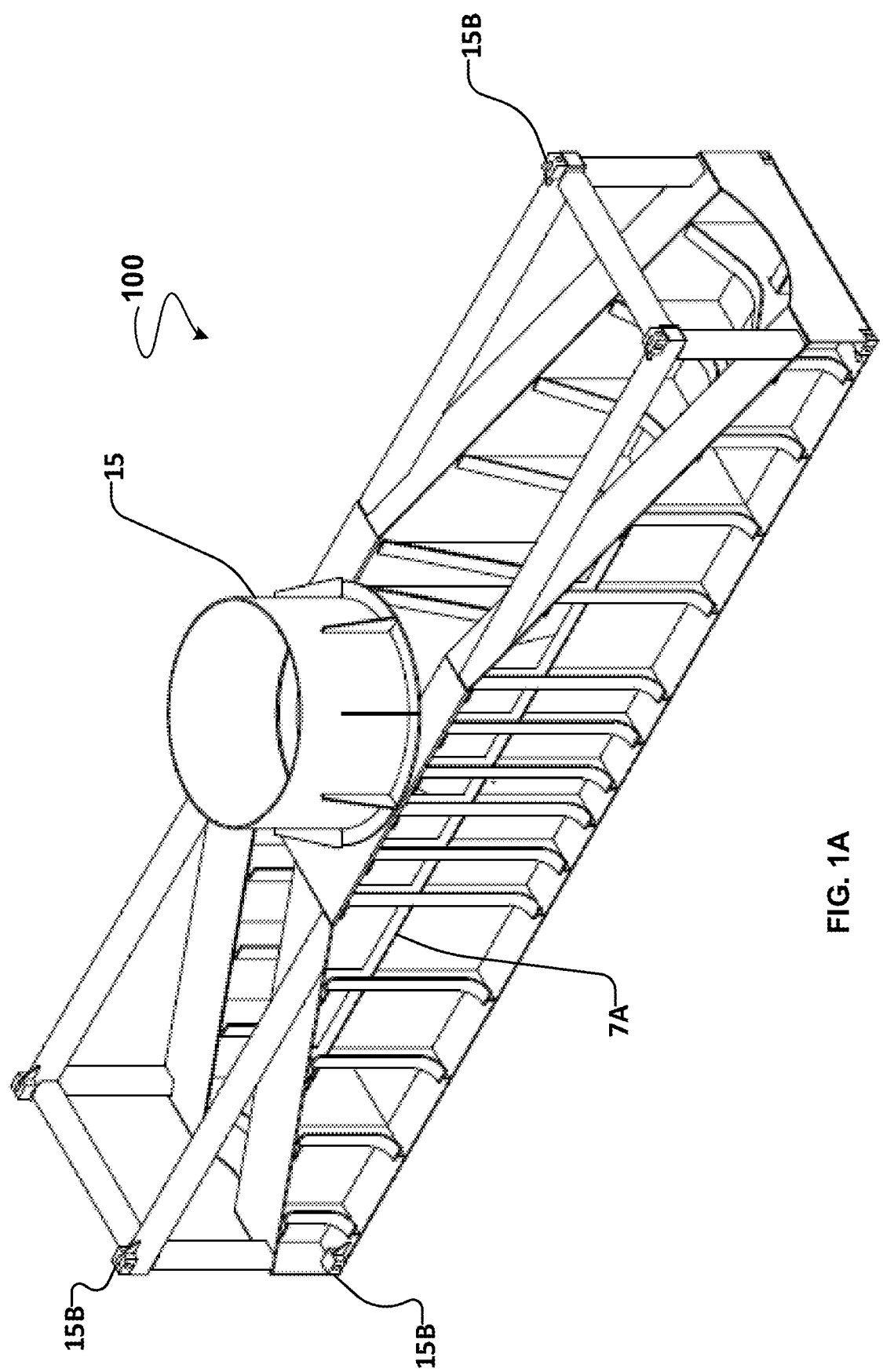
FIG. 1A shows the grillage shown in FIG. 1 with an adapter installed thereon.

The solid section 4 in the embodiment shown in FIG. 1 is shown to be composed of a plurality of plates 6 substantially parallel to one another and fixed to base 3 in a configuration orthogonal to based 3. Plates 6 are spaced apart from one another along the longitudinal direction L of grillage 100 and are substantially parallel to a plane of the minor sides 2 of grillage 100. In some embodiments, plates 6 are approximately parallel to a plane of the minor sides 2 of grillage 100. The thickness of plates, spacing between plates and number of plates could vary depend on the design limits of grillage. In the embodiment shown in FIG. 1, each adjacent pair of plates 6 is connected to a longitudinal plate 7 normal to the pair of plates 6 and base 3 and dimensioned to fill the spacing between the pair of plates 6 along the boundary of the long sides 1 of grillage 100. Plate 7 is considered optional and may be used to enhance structural integrity of grillage 100. For example, in cases of the need to support heavier loads, structural re-enforcement of plates 6 in grillage 100 may be provided by plates 7. The addition of plates 7 will of course cause the overall weight of grillage 100 to increase. So, it is to be understood that such plating will be provided while still maintaining the specifications of grillage 100 to conform with ISO specification for intermodal containers. In other embodiments, where the enhanced structural re-enforcement is not needed and/or excess weight is required to be removed from grillage 100 so that it may conform with ISO specifications for intermodal containers, plating 7 may be removed from grillage 100 and may be replaced by a beam extending along the longitudinal direction L and is substantially parallel to based 3 such that the beam 7A connects all plates 6 and provides structural support of grillage 100 (See FIG. 1A).

Each of plates 6 is configured to have a recess 8 in a vertical configuration such that when placed vertically on base 3 and spaced apart from one another, the recess in the plurality of plates 6 is configured to form a void structure 8A leading to the centre of the solid section 4 of grillage 100. As may be seen in FIG. 2, which shows a front view of grillage 100, the recesses of plates 6 creating void 8A allow for a path from the outer edge of grillage 100 near one of minor sides 2 to the centre of the solid section 4 of grillage 100.

The centre section 9 of grillage 100 is also void as a result of the recess in plates 6 fixed to base 3 of grillage 100. The recesses 8 of plate 6 near and at the centre section of solid section 4 allow centre section 9 to be shaped and configured for receiving a heavy structure such as a leg of a jacket of a windmill, oil rig, electrical transmission towers or the like, having a male end for snuggly fitting into the void 9 of grillage 100. In some embodiments, the shape of the voids 8A allows for the passing of the male end of a leg of the jacket from the outer edge of grillage 100 along one of its minor sides 2 and into the centre section 9, where the male end is completely received by the void of centre section 9 but is not necessarily snuggly fitted into the void section.

Figure 3:
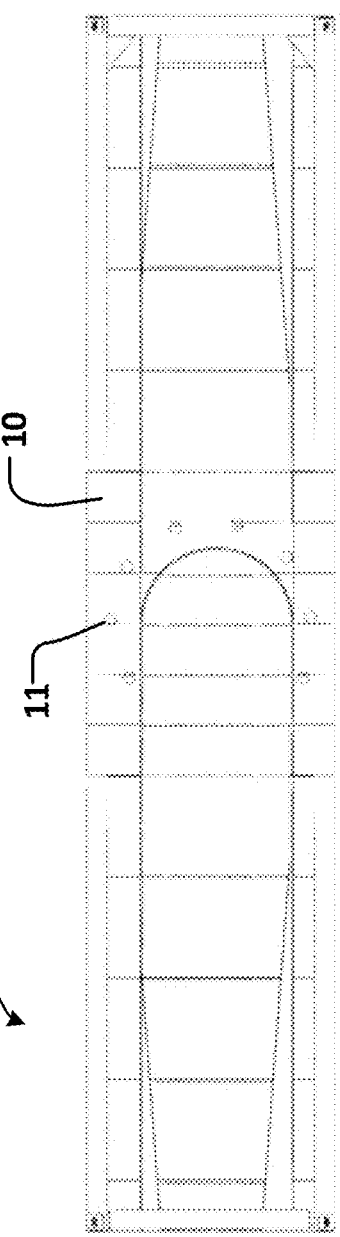
FIG. 3 shows planar view of the grillage shown in FIG. 1.

At the centre section of grillage 100, a horizontal plate 10 rests on the upper part of a number of plates 6 placed in sequence from one another and forming the centre section of grillage 100. The horizontal plate 10 is shown in FIG. 1 to be fixed to such plates. This is also shown in FIG. 3, which describes a top view of grillage 100. Horizontal plate 10 is oriented to be parallel to base 3 and is shaped to a have recess on one end so as to allow passage of the male end of a jacket leg from the outer edge of grillage 100 through void 8A and into the centre section 9 of grillage 100. As seen in FIG. 3, the recess or cavity in plate 10 may cause plate 10 to form a horse shoe shape or half round opening. However, such shape is to be considered exemplary and not a limitation. It is to be understood that other shapes may be formed, when viewed from a planner view, so long as the recess allows the male end of a leg of a jacket to fit into the centre section 9 of grillage 100.

The surface of plate 10 may form a base on which a member of structure support points (i.e. Topsides/Jacket legs) may rest and be fixed to in order to form a unitary structure with grillage 100. In the embodiment described in FIGS. 1-4 and more clearly shown in FIG. 3, plate 10 may have threaded holes 11 that are used for bolting a member of the leg of a jacket to plate 10 of grillage 100. In other embodiments, different attachment means known in the art may be used in addition to or in place of bolting to fix the member of the leg of a jack to plate 10 of grillage 100. This is clearly shown in FIG. 6D and FIG. 6E, which show a partial perspective view of grillage 100 with a leg 12 of a jacket (not shown) having a member or plate 13 resting on plate 10. Plate 13 is configured to have threaded holes to match the position of threaded holes on plate 10 so that when aligned, the two plates may be bolted to one another using bolts 14. Such attachment mechanism allows for easy assembly and disassembly of the jacket leg to and from the grillage 100 to make it removably connectable to grillage 100. As mentioned above, the attachment of plates 10 and 13 may be performed using different techniques such as use of pins, twist locks and the like as well as welding or other attaching techniques known in the art or a combination thereof.

Figure 5A:
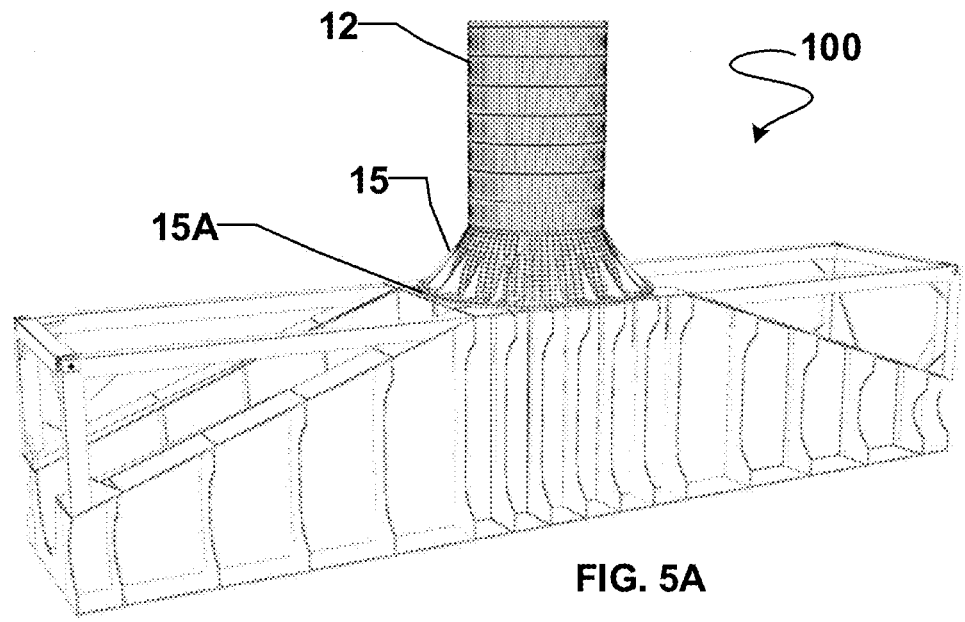
FIG. 5A shows the grillage as shown in FIG. 1 supporting an adapter for receiving a leg of a jacket according to an embodiment of the invention.
Figure 5B:
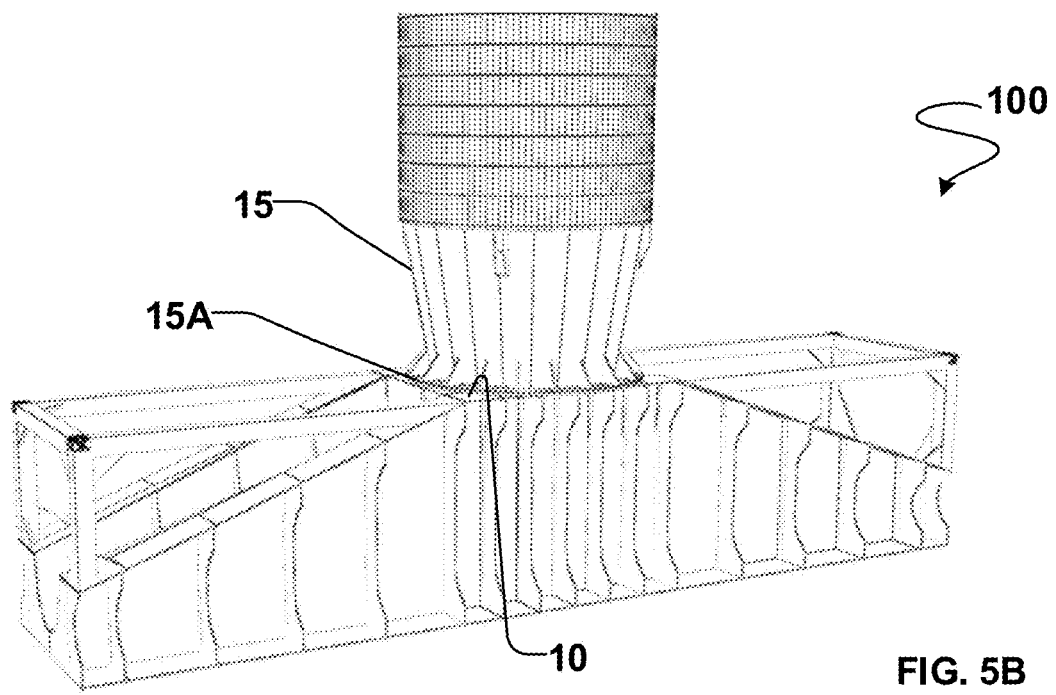
FIG. 5B shows the grillage as shown in FIG. 1 supporting an adapter for receiving a leg of a jacket according to another embodiment of the invention.

It is known in the industry that transported structures (i.e. jackets, Topsides, modules . . . etc) may differ in size depending on the objective they are intended for. For example, different size jacket may lead to different size and thickness of the leg supporting it. In order to allow grillage 100 to be used universally, in some embodiments, the attachment of the grillage 100 to the leg of a jacket is facilitated by use of adapters. Such adapters ensure compatibility of grillage 100 with different size jacket legs corresponding to different size jackets. FIGS. 5A and 5B show examples of such adapters. In these figures, an adapter 15 with a base plate 15A is positioned on the centre section of grillage 100 such that plate 15A rests on plate 10 of grillage 100. In some embodiments, plate 15A may have threaded holes corresponding in location to threaded holes 11 in plate 10 of grillage 100. Plate 15A in such embodiments may be fixed to plate 10 by aligning the holes of plate 15A with those of plate 10 and using bolts to bolt the two plates together to form a unitary structure. Other means may be used in place of or in addition to bolting to attach the plates to one another.

As may be seen from FIGS. 5A and 5B, the adapter 15 may differ in shape and size to accommodate the size and thickness of the shown jacket leg for which it is intended. However, it should be noted that the plate 15A of adapter 15 will always be configured to allow for adapter 15 to be fixed to grillage 100 to form a unitary structure. FIG. 5A shows an example of adapter 15 having a frusto-conical shape dimensioned to have a wider bottom end. FIG. 5B shows another example of an adapter having a frusto-conical shape dimensioned to have a wider top end. It is to be understood that adaptor dimensions and shapes are not limited to the adapter and structure's support point dimensions and extends to other adapter and support points sizes and shapes.

In some embodiments, adapter 15 may be first fixed to grillage 100 and then the structure support point (i.e. jacket/Topsides legs) is lowered into the adapter. In such embodiments, it is envisioned that a crane is used to lift the jacket above the grillage and to lower it so that the bottom portion of the leg of the jacket may be inserted into the adapter in a top-down formation. In other embodiments, the adapter may be fitted into the jacket leg first and then the leg with the adapter are fitted into the centre section of the containerised grillage. In such embodiments, the grillage and fitted adapted only need to be lifted high enough so that the adapter plate clears the top section of the containerised grillage and so that the male end of the jacket leg is able to pass through the void created by the recesses of the plates forming the solid section of the containerised grillage. In such embodiments, Self Propelled Modular Transports (SPMTS) may be used to lift the jacket structure. For the latter type of embodiments, a crane may also be used to lift the jacket with fitted adapter above the grillage and to lower it so that the jacket leg and fitted adapted are inserted to the centre section of the containerised grillage in a top-down formation.

Given that weight is an important factor in making grillages as such weight directly affects shipping possibility by ocean going container carrier/roads/rails when transporting the grillage from one location to another, it is desired to minimize the weight of the grillage without jeopardising its structural integrity or its functionality. To this end, the different embodiments presented in this disclosure show configurations, voids, cavities or tapered sections to remove sections of the containerised grillage, where such removal does not affect the structural integrity or functionality of the grillage.

Returning back to FIGS. 1 and 4, plates 6 are shown to differ in size where plates 6 forming the centre part of the solid section of grillage 100 are tallest and the height of plates 6 decrease along the longitudinal direction leading to the minor sides 2 of grillage 100. The reduction in height is implemented as per structural behaviour of metal for load distribution, for example steel tends to distribute loads on longer length allowing 30-degree angle with vertical. The result of this configuration is that the top surface of the solid part of grillage 100 is shown to be tapered down from the centre to the minor edges along the longitudinal direction. This allows for decreasing the weight of the grillage without jeopardising the structural integrity or functionality of the grillage, as will be elaborated on in a later section of this disclosure.

In FIG. 1, grillage 100 is shown to have a load bearing framework 5 designed to be attached to the solid part of grillage 100 so as to provide edges to the top part of the grillage and to provide a containerised shape to grillage 100. Framework 5 is shown to have two opposing L-shaped beams substantially parallel to one another, where for each L-shaped beam, the long side is oriented to be substantially parallel to base 3, and the end of the long side rests near the centre section of the solid part of grillage 100 along its longitudinal axis causing the long side to be flush with plate 10 of grillage 100. The short side of the L-shaped beam is oriented to be substantially perpendicular to base 3 and the end of the short side of the L-shaped beam rests on the top section of the solid part of grillage 100 near or at the minor sides 2 of grillage 100.

Figure 4:
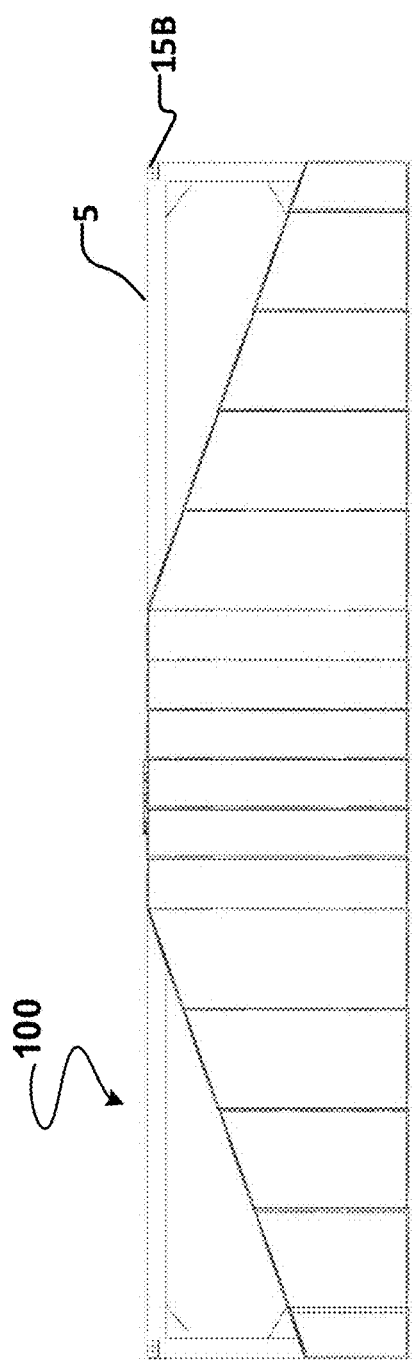
FIG. 4 shows a side view of the grillage shown in FIG. 1.

Each of the L-shaped beams, when attached to the solid part of grillage 100 provide the grillage with overall peripheral shape comparable to that of an intermodal container. This may be clearly seen in FIG. 1. It may also be seen in FIG. 4, which shows a side view of grillage 100 in FIG. 1. In FIG. 1 and FIG. 4, the outer periphery of grillage 100 is shown to be of equivalent dimensions to that of a 40-foot ISO container. In other embodiments, the containerised grillage 100 may have different dimensions known in the art conforming with ISO specification for other intermodal containers. Different techniques known in the art may be used to attach the L-shaped beams to the solid part of grillage 100. By way of none limiting example, the attachments may be done through welding the ends of the short and long sides to their corresponding parts of the solid part of grillage 100. In the embodiment shown in FIGS. 1-4, the attachment is shown to be permanent one such that once attached, the framework and the solid part of the grillage 100 will form a unitary structure.

Figure 2:
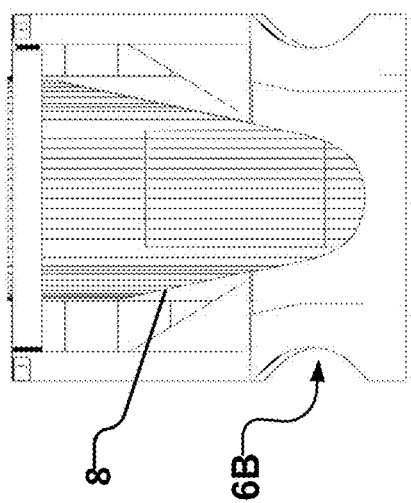
FIG. 2 shows a front view of the grillage shown in FIG. 1.

FIG. 1 shows that the Framework 5 also includes a lateral beam connecting the corner edges of the opposing L-shaped beams. The lateral beam is oriented to be normal to the longitudinal axis and substantially parallel to base 3. The combination of the lateral beam when connected with the corner edges of the L-shaped beams, which in turn have their short sides connected to the top part of the solid part of grillage 100, create a periphery along the minor side 2 of grillage 100 corresponding to that of an intermodal container under ISO specifications. This is clearly seen from FIG. 1 and also from FIG. 2 showing the front view of grillage 100.

The lateral beam for at least one minor side 2 of grillage 100 is configured to be releasably attachable to the corner edges of the opposing L-shaped beams. In this case, this lateral beam is called a gate and is designated as 5A in FIG. 1. Gate 5A may be releasably secured to the corner edges of the L-shaped beams in various ways known in the art. For example, one end of gate 5A may be releasably secured to one L-shaped edge while the other end being secured to the opposing L-shaped edge by a hinge to allow the gate 5A to be released from one side and to pivot about an axis of rotation near the other edge simulating a gate movement. Alternatively, both ends of gate 5A may be fixed to their corresponding corner edges of the opposing L-shaped beams by pins, twist locks, clips or the like and upon release, the gate 5A may be removed partially or entirely from the framework structure.

In the embodiment described in FIG. 1, gate 5A is located along the periphery of minor side 2 facing the open end of the recess of plate 10. The lateral beam on the opposing minor side 2 may be connected in permanent fashion with the corner edges of the opposing L-shaped beams on that side of the grillage 100. In other embodiments, the lateral beam on the opposing side from the open end of the recess of plate 10 may also be releasable attached to the corner edges of the opposing L-shaped beams on that side of the grillage in a similar configuration to that of gate 5A. The operation of gate 5A to facilitate the loading and offloading of a jacket leg onto grillage 100 will be described in a later section of this disclosure.

The combination of framework 5 and solid part 4 of grillage 100 allows the grillage to have a peripheral shape of a container. Therefore, due to this shape, when it is desired to move the grillage from one location to another, the grillage may be shipped as a container given that the containerised grillage is designed to conform with ISO specifications for intermodal containers. This allows easy and cost-effective shipping of the containerised grillage without the need to resort to irregular shaped shipping means to house the grillage. Also, given that the grillage itself takes the form of a container, there is no need to house it in anything for shipping.

Framework 5 may also include standardised corner blocks positioned on the four corners of the framework forming a peripheral top shape conforming to that of an ISO intermodal container. Each corner block being rigidly fixed in a corner, so that the free flat external sides of the corner blocks are substantially flush or slightly proud of the corresponding sides of the framework associated therewith. Similarly, base 3 may also be equipped with four corner blocks, each block being rigidly fixed in a corner, so that free flat external sides of the corner blocks are substantially flush or slightly proud of the corresponding sides of the base 3.

Each corner block typically comprises a hollow fabricated or cast steel box-like structure which defines an internal space with external sides of the corner block defining openings in the forms of slots of a standard size and shape which lead into the internal space. The slots are typically ovaloid in shape and are configured to co-operatively receive block mounting formations, such as, for example, orientating pins, latching devices, hooks, twist-lock connectors or other hardware which is provided and required for lifting and securing the containerized grillage, in use, in an arrangement wherein components thereof project through the slots defined by the corner blocks and are located within the internal space of the corner blocks.

The corner blocks of base 3 in grillage 100 may be used to secure the containerised grillage to the substrate of a ship or moving vehicle, when in use, during transportation. When the grillage is not in use, the corner blocks on the base and framework of the containerised grillage may allow for securing the base of a containerised grillage to the base of the ship and the stacking of additional containerised grillages on top of it or on top of standardised ISO intermodal containers in a vertical configuration so as to allow for shipping multiple grillages at once either alone or among other intermodal containers in a standard container carrying vessels. In some embodiments, other techniques known in the art may be used in addition to or in place of corner blocks to secure the base of the containerised grillage to the base of the ship. In some embodiments, the base of the containerised grillage is secured to the ship using such techniques so that the entirety of the periphery of the base is secured to the ship. In other embodiments, only sections of the periphery of the base may be secured using such techniques.

Figure 8:
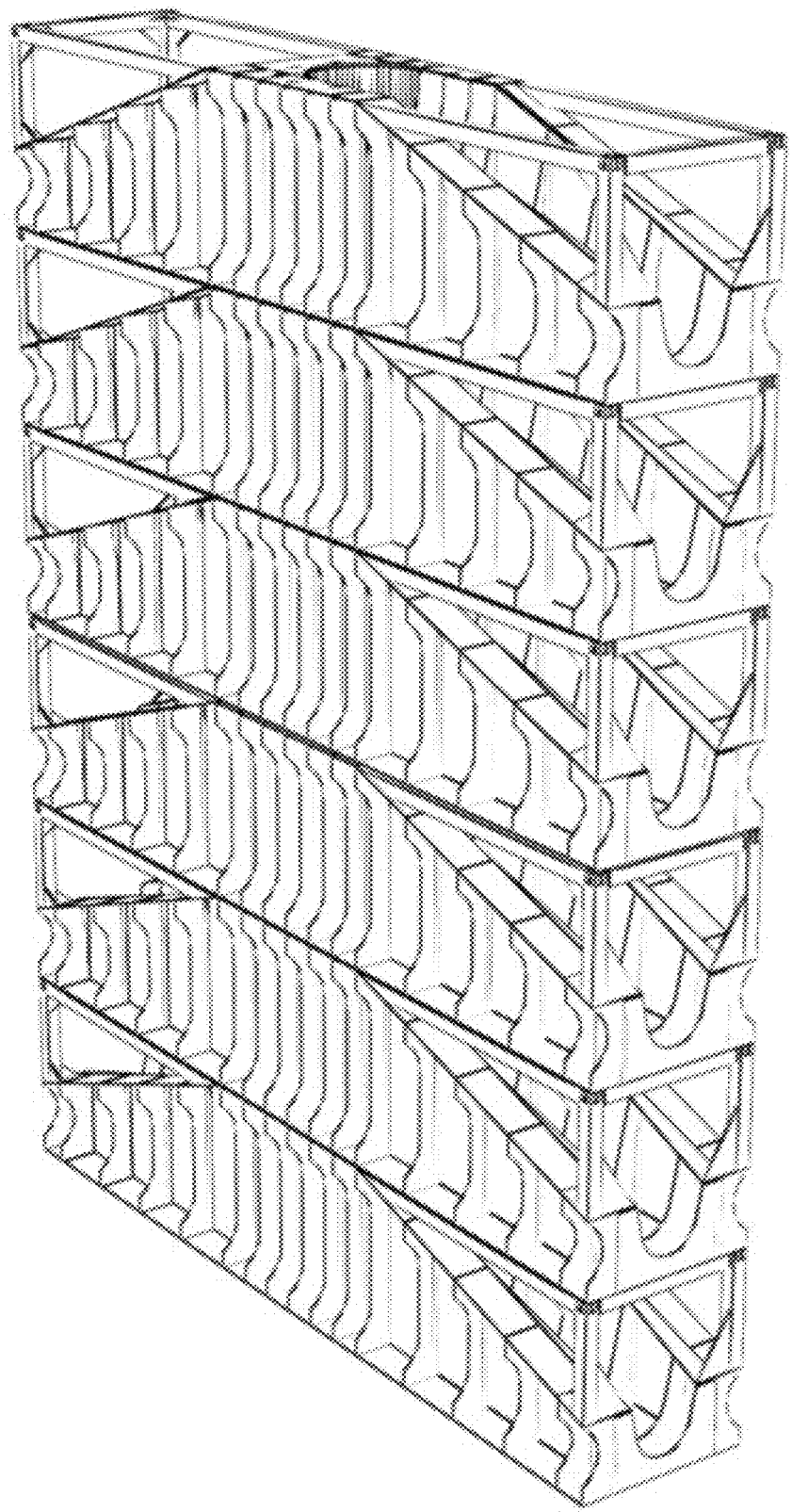
FIG. 8 shows a perspective view of six grillages stacked in a vertical orientation, where each of the grillages is as shown in FIG. 1.

FIG. 8 shows six containerised grillages stacked on top of each other in a vertical configuration. Corner blocks (not shown in FIG. 8) may be used to secure the base of a containerised grillage to the top of the framework of the containerised grillage below it. Although FIG. 8 only shows six containerised grillages stacked on top of one another, it is to be understood that more or less number of containerised grillages may be stacked in a vertical configuration according to various embodiments of this invention.

So, a combination of factors such as the presence of the corner blocks on the corners of the containerised grillage as well as the size, external shape and weight of the containerised grillage conforming to that of an intermodal container according to ISO specifications allows the containerised grillage to be handled as a regular container during shipping. This significantly reduces shipping costs for shipping the container from the shipping destination to original yard location and vice versa. The ability to use standard shipping methods to ship grillages also creates a significant cost saving in shipping grillages back to their origin or to another location for new use especially since such containers are stackable and do not require special and costly arrangement for shipping them back. Therefore, reusability of grillages is facilitated by the current disclosure given the virtual lack or ease of disassembly requirements after the original use and the ease and cost effectiveness of shipping such grillages.

Referring back to FIG. 1, FIG. 2 and FIG. 4, the containerised grillage 100 is shown to have cavities near the top periphery of the containerised structure of grillage 100. Also, the plates 6 of the solid section 4 of grillage 100 are shown to have recesses along their outer edges. It is to be understood that such recesses are optional and may be avoided if necessary subject to the type and nature of the load which may dictates enhancing the structural integrity of the containerised grillage near its base. The same is applicable for other cavities in the containerised grillage so long as the overall weight of the containerised grillage is maintained in conformance with the ISO specifications of intermodal containers.

As explained in previous sections, the removal of parts from the containerised grillage structure is done to reduce excess weight of the containerised grillage without jeopardising the structural integrity or functionality of the containerised grillage. Different techniques may be used to determine excess weight in parts of the containerised grillage structure that may be removed without affecting the structural integrity or functionality of the containerised grillage. For example, finite element analysis using ANSYS™ may be used to determine the stress levels on various parts of a model containerised grillage structure under different load configurations. For example, the model may be simulated under vertical (or top) loading configuration only to mimic conditions of the grillage under stress from a jacket, when the jacket is stationary. The model may also be simulated under a combination of vertical and lateral load configuration to simulate either the grillage under stress from the jacket, while the jacket is being transported or the grillage under stress from other grillages also during transportation in a stacked configuration.

Figure 7A:
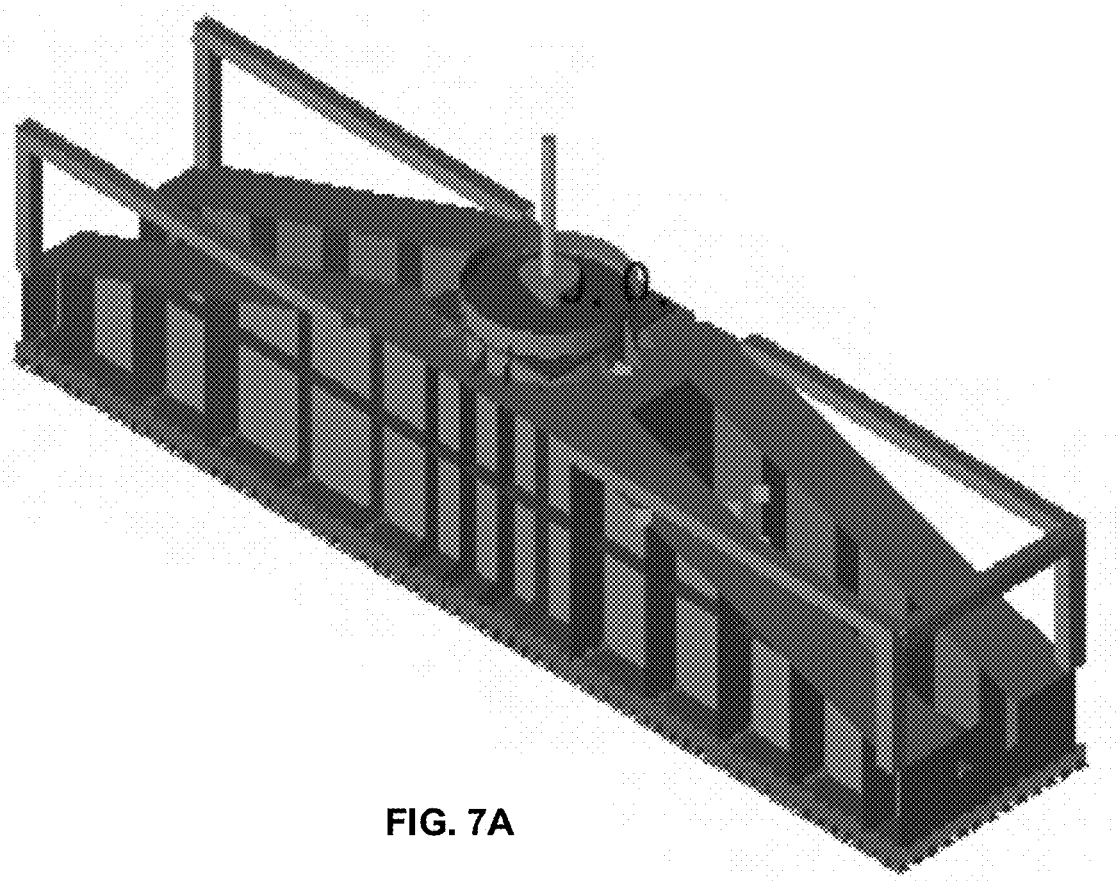
FIG. 7A show a perspective view of a simulation model of the containerized grillages according to an embodiment of the invention, where the containerized grillage is subjected to a load.
Figure 7B:
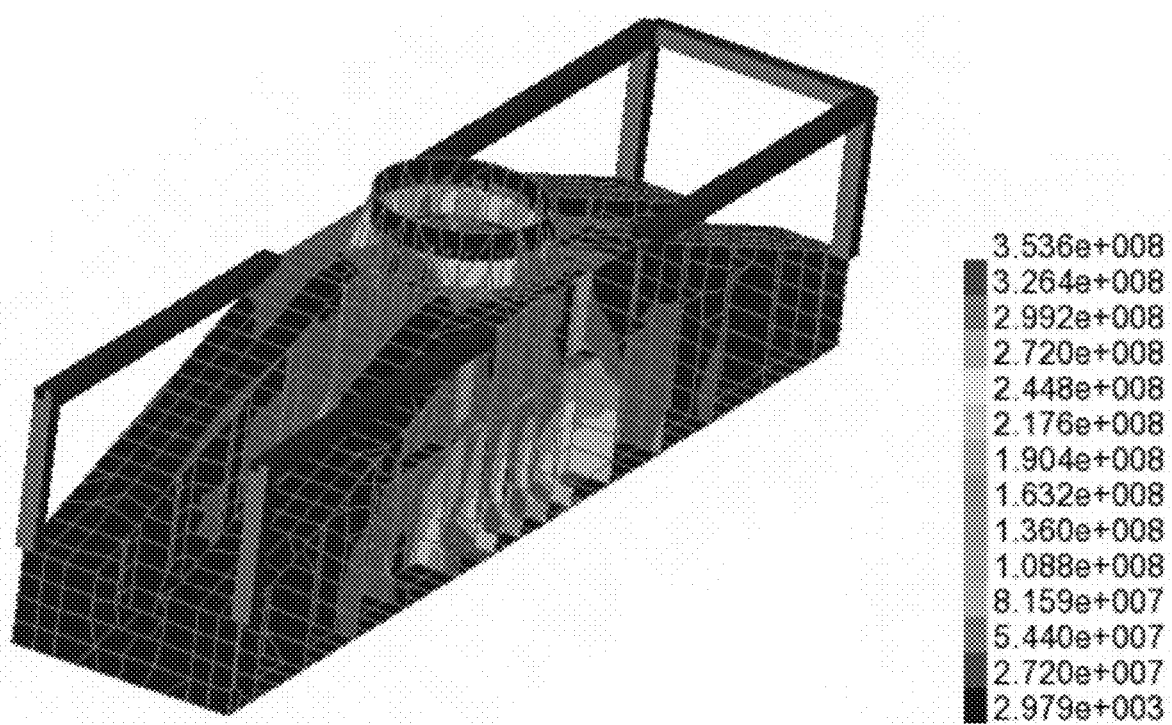
FIG. 7B shows stress analysis results of the containerized grillage of FIG. 7A presented in perspective view.

FIG. 7A to FIG. 7D show simulations of a design of a containerised grillage, according to an embodiment of the present disclosure, under different conditions to assess the stress levels on the grillage under such conditions. In FIG. 7A, the grillage is simulated so that the base 3 is fixed to the deck of a vessel and the grillage is subjected to a vertical/horizontal load onto its centre from the structure support points (i.e. jacket leg) being mounted on the grillage, while the jacket is transported on a surface of a vessel. In such case, motion of the jacket transferred from the different motions of the vessel including surge, sway, heave, roll, pitch and yaw motions of the vessel may lead to subjecting the containerised grillage to a dynamic loading resulting from vessel motion. FIG. 7B shows the results of the stress analysis on the containerised grillage structure subject to the above condition. The stress level results in FIG. 7B for all parts of the grillage structure are shown to be intermediate between the two extreme ends provided on the scale in the figure. This implies a structurally safe design that lacks overdesigned parts.

Figure 7C:
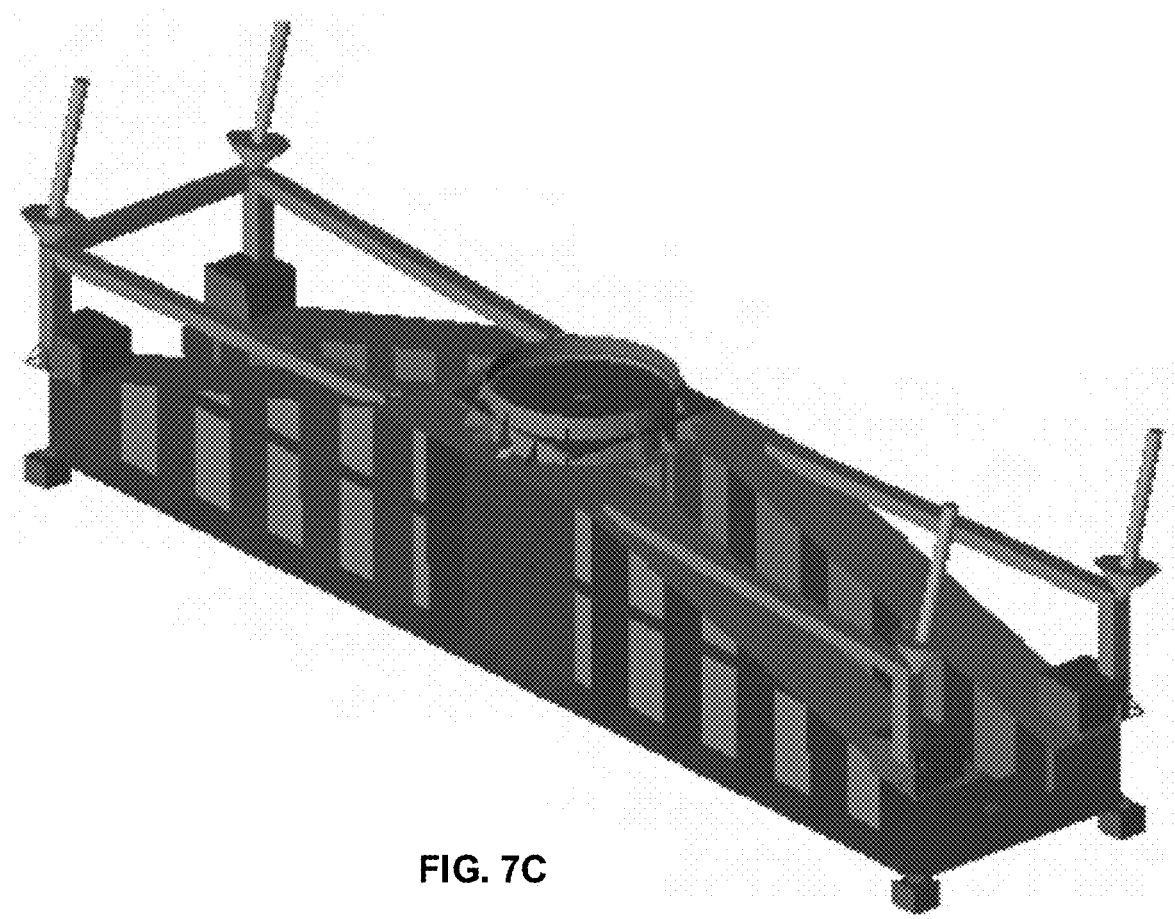
FIG. 7C show a perspective view of a simulation model of the containerized grillages according to another embodiment of the invention, where the containerized grillage is subjected to a load.
Figure 7D:
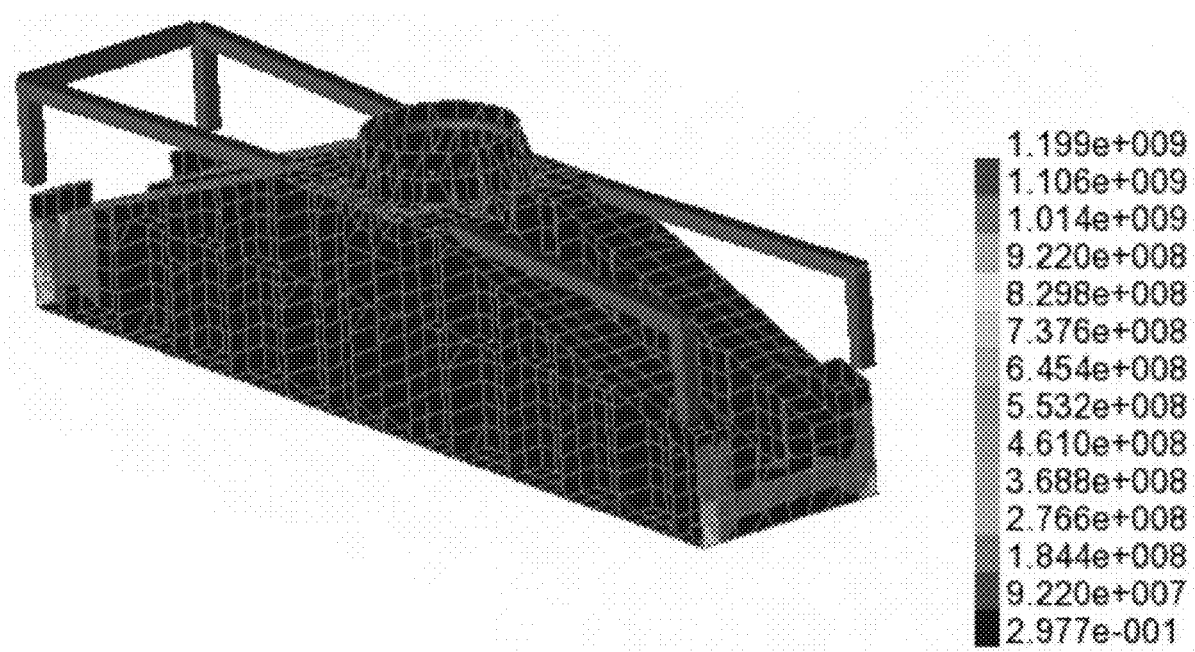
FIG. 7D shows stress analysis results of the containerized grillage of FIG. 7C presented in perspective view.

FIG. 7C shows another simulation design in which the grillage is not in use and is being transported on board of a vessel in a stacked orientation, where the containerised grillage is bearing a load of other containers and where the load is applied on the four corners of the framework of the containerised grillage. In the simulation, the base is also fixed only at the four corners of the base corresponding to the corner blocks. Due to possible movement of the stacked configuration of the containerised grillages due to sea motion of the carrying ship, lateral and vertical loads had been applied to the four top corners of the containerised grillage to verify the structural integrity of the grillage for sea transportation by container liners. FIG. 7D shows the results of the stress analysis on the containerised grillage structure subject to the above condition. FIG. 7D shows that the majority of the stress is applied on the load bearing framework, as to be expected in such scenario. The results also show that stress levels on parts of the design containerised grillage fall intermediate between the two extremes ends provided on the scale in the figure. This implies a structurally safe design that lacks overdesigned parts.

Referring to FIG. 6A to FIG. 6E, the figures describe the steps involved in loading a jacket leg (or a jacket leg fitted with an adapter) onto the containerised grillage. FIG. 6A describes a partial perspective view of the containerised grillage at one of longitudinal ends (minor sides 2), where gate 5A of frame 5 is shown to be secured in position. In FIG. 6B, gate 5A is unlocked on one of its ends and the gate is opened to allow access to void 8A from the outer edge of containerised grillage 100 next to gate 5A. In FIG. 6C, a leg of a jacket is slid into void 8A through the opening created by the unlocking of gate 5A. As seen from FIG. 6C, the leg is shown to have a member plate that clears the top of the containerised grillage. In FIG. 6D, the leg of the jacket is shown to have slid to the centre void section 9 of grillage 100 and the plate member 13 of jacket 12 (or the plate member 15A of adapter 15 in some embodiments) resting on top of plate 10 of the solid part of grillage 100. FIG. 6D also shows holes on plate 13 that correspond to holes 11 on plate 10 of the solid part of grillage 100. In FIG. 6D, the two plates are oriented such that the holes in the plates correspond to one another and bolts are used to secure the leg and fitted adapter to the containerised grillage. It is to understood that different techniques for securing the leg or adapter to the containerised grillage may be used. By way of none limiting example, in addition to using bolts through threaded holes to secure the plate of the adapter to the plate of the grillage, pins, twist locks or the like may be used. The final step of loading the jacket onto the containerised grillage is shown in FIG. 6E, which shows a perspective view of the containerised grillage with the leg of the jacket secured to the grillage to act as a unitary structure. Gate 5A is closed at this step and is secured back to form part of the framework of the containerised grillage.

Figure 9:
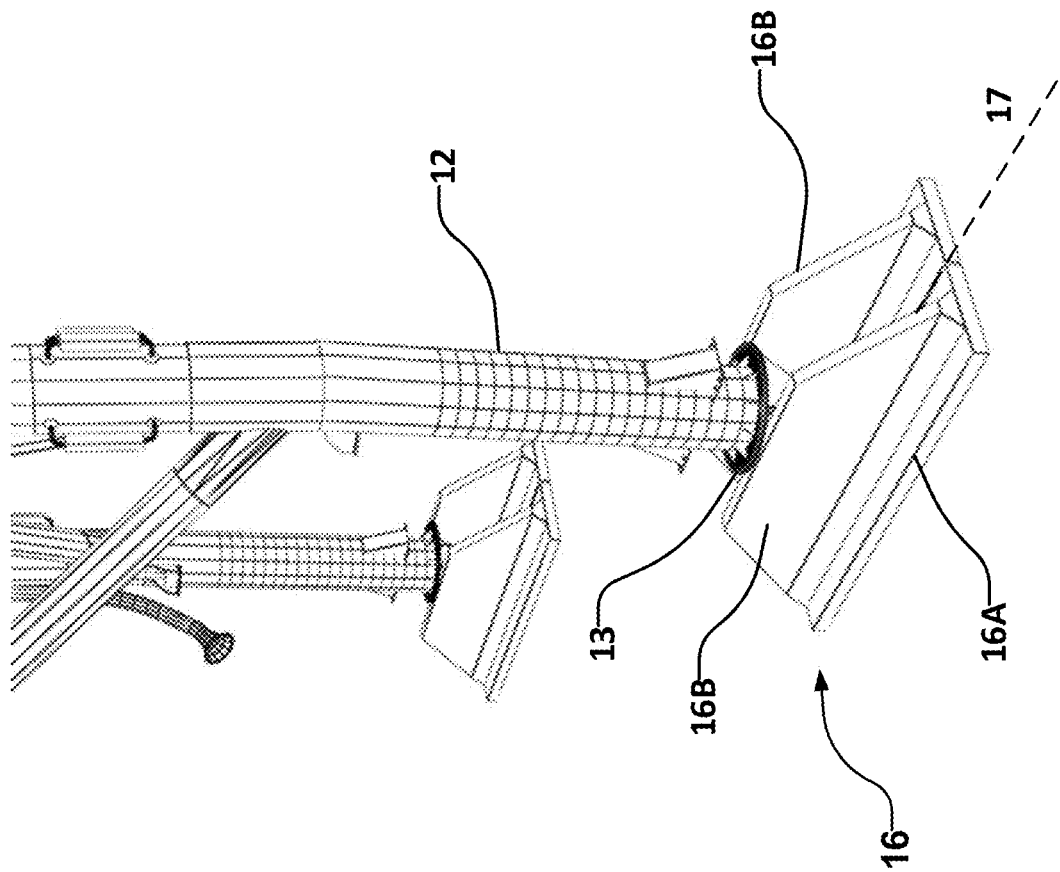
FIG. 9 shows a perspective view of a partial jacket, where the legs of the jacket are loaded on concrete supports on the ground of a yard according to an embodiment of the invention.
Figure 9:
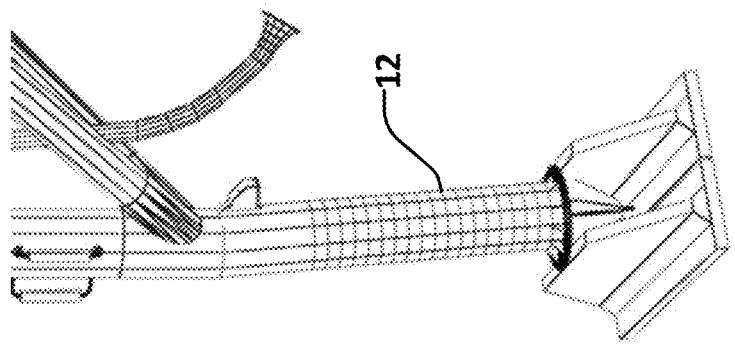

FIG. 9 shows a perspective view of a partial jacket, where the legs 12 of the jacket are loaded on concrete supports 16 on the ground of a yard according to an embodiment of the invention. The concrete support 16 provides a simplified structure for supporting legs 12 of a jacket on land and a cheaper alternative to steel. Support structure 16 is not limited to concrete and may also be made from timber or reinforced polymer for example. Support 16 is shown to have a base 16A and a load bearing structure composed of two opposing plates 16B. The opposing plates are oriented to be protruding from and normal to base 16A, substantially parallel to one another and extending along a longitudinal axis 17. In the embodiment shown in FIG. 9, each of plates 16B has a centre that protrudes the most from the base 16A in comparison to remaining parts of plate 16B. In other embodiments (not shown), plates 16B may be dimensioned to have uniform or substantially uniform vertical length from one end to another along its longitudinal axis, with the centre section protruding the same or the most from base 16A in comparison to other parts of plates 16B.

In the embodiment shown in FIG. 9, plates 16B are shown to taper in vertical length along the longitudinal direction moving from the centre to either end of the plates 16B, where either end of the plate 16B are slightly protruding from base 16A. The height of the centre section of plate 16B is dimension to be slightly taller than the length of the male member of leg 12 of a jacket. The spacing between substantially opposing plates 16B is wide enough to allow the male end of leg 12 of a jacket to slide between the two opposing plates 16B and narrow enough to allow the plate member 13 of legal 12 to rest on top of the centre section of plates 16B. The structure maybe extended on both sided of 16B to distribute the load on the ground. In some embodiments, different means known in the art for securing the jacket leg 12 to structure 16 may be used. In other embodiments, such securing means may not be required, where at least a tripod effect may be enough to maintain balance of the jacket when supported stationary. In some embodiments, base 16A may have a subterranean section (not shown) for increased stability to support structure 16. Such subterranean section may have different length and width depending on the different characteristics of the soil of the ground, in which the subterranean section is immersed.

The method of making the containerized grillage will now be described. This method comprises the steps of providing metallic plates; cutting such metallic plates to form recesses therein; configuring and orienting the plates to be assembled together such that the plates form an elongated structure that conforms with ISO specifications for an intermodal container; the assembled elongated structure having a hollow shape therein formed by the recesses of the plates; bonding the plates together using any one of bonding structures such as plates or beams; attaching a frame composed of additional plating or beams to allow the assembled structure to have dimensions including size, peripheral shape and weight conforming with those of an ISO intermodal container. In additional embodiments, the method also includes the step of attaching block containers to the edges of the containerised grillage structure. In further embodiments, the method further includes the steps of cutting the metallic plates such that the plates have different sizes and different recess sizes, such that when the plates are assembled, the elongated structure formed by the assembled plates will have a central section taller in vertical height than either end of the structure along its longitudinal axis. In such embodiment, the height of the structure assembled from the plate will be tapered from the centre of the structure to either end of the structure along its longitudinal axis. The hollow shape of the assembled containerised grillage will be suitable for a male end of a leg of a jacket structure to slide through it and to fit into a central section of the containerised grillage such that the leg may be secured to the containerised grillage by fixing means such as pins, bolts or the like.

Figure 10A:
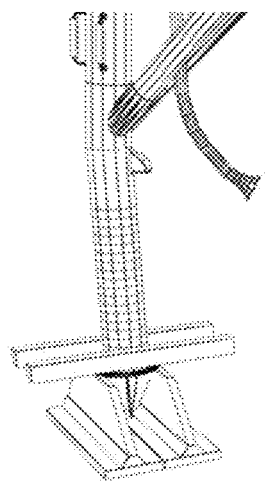
FIG. 10A to FIG. 10I show a method of moving a jacket structure from a yard to a ship for transportation of same using a plurality of grillages as shown in FIG. 1.
Figure 10A:
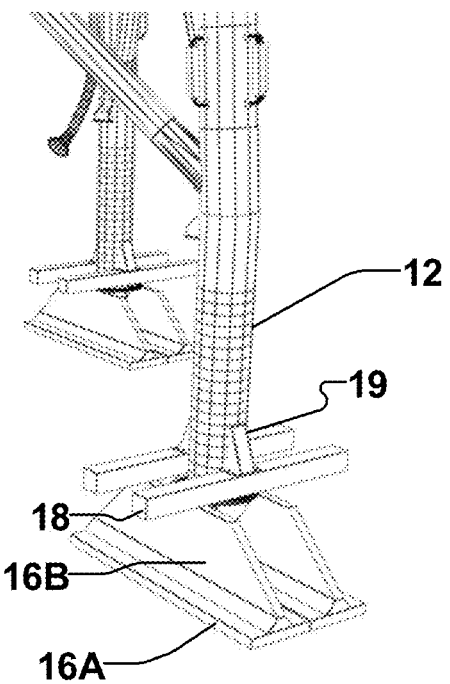
Figure 10B:
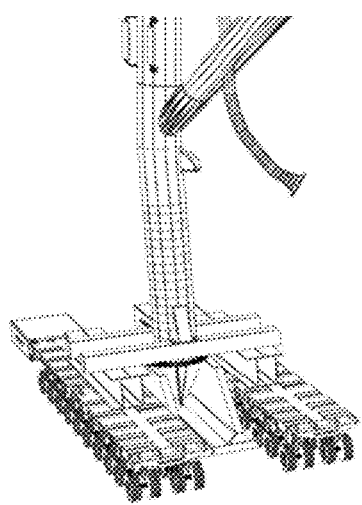
Figure 10B:
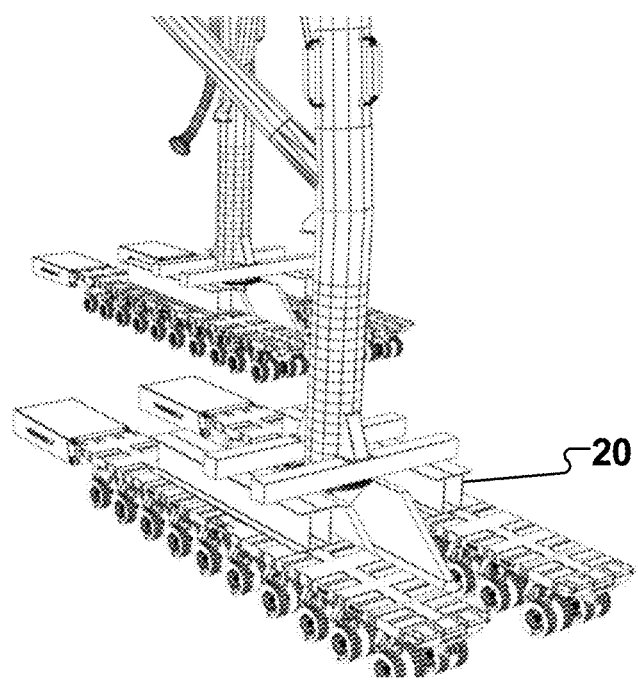
Figure 10C:
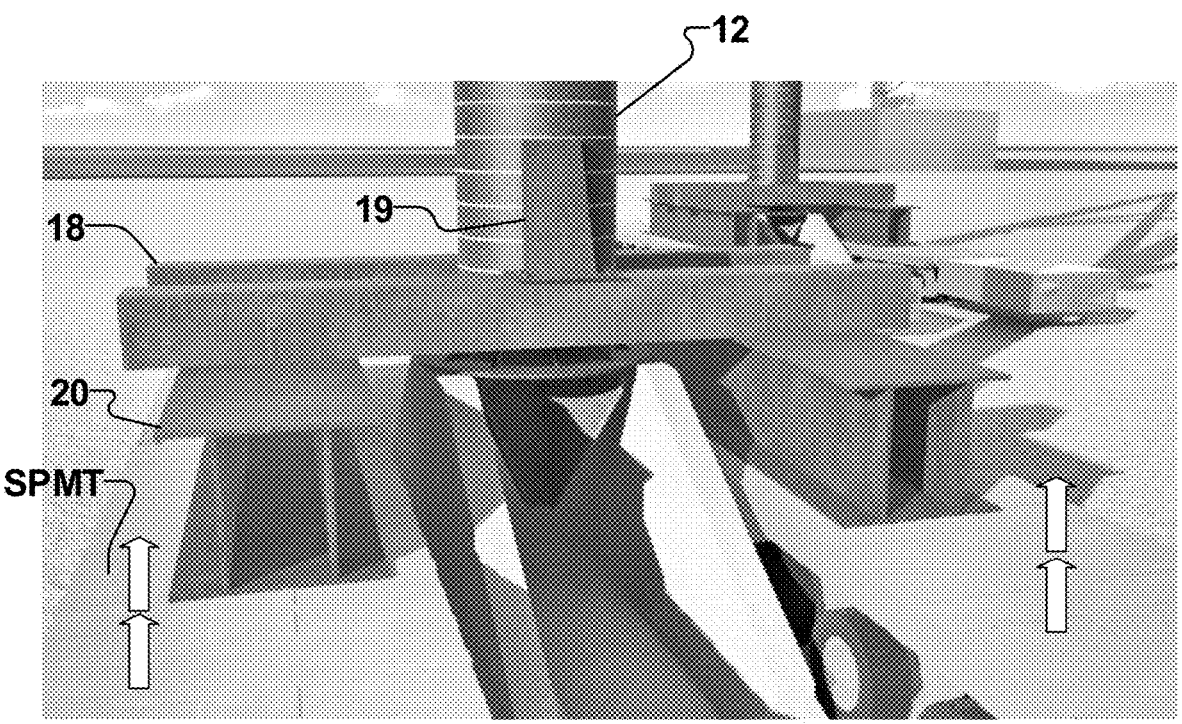

Referring now to FIG. 10A to FIG. 10I, a method of moving a jacket structure from a first substrate position to a second substrate position is described, where the first substrate position is a fixed position on land similar to that shown in FIG. 9 and the second substrate position is on a vessel for transporting the jacket. Starting from the jacket legs 12 shown in FIG. 9, in FIG. 10A, each leg 12 of the jacket is equipped with a pair of load out beams 18 secured to opposite sides of leg 12 such that the load out beams are either resting on plate 13 of leg 12 or fixed to a separate support structure 19 on leg 12 slightly higher than plate 13 and such that the load out beams are oriented to be substantially parallel to the ground and substantially normal to the longitudinal axis 17 of plates 16B. In FIG. 10B, an SPMT is positioned below the load out beams 18 such that when the load spread beam 20 of the SPMT is raised above the level of the maximum height of plates 16B and is configured to engage the load out beams, it will lift the leg 12 of the jacket structure. As seen in FIG. 10B, this step is performed for all legs 12 of the jacket structure simultaneously and in synchrony to maintain the jacket structure balanced in an upstanding orientation throughout the lifting process. FIG. 10C shows a closeup view of the load spread beam 20 of the SPMT engaging the load out beams 18 and lifting it in the direction of the arrows representing the direction of movement of the load spread beam 20.

Figure 10D:
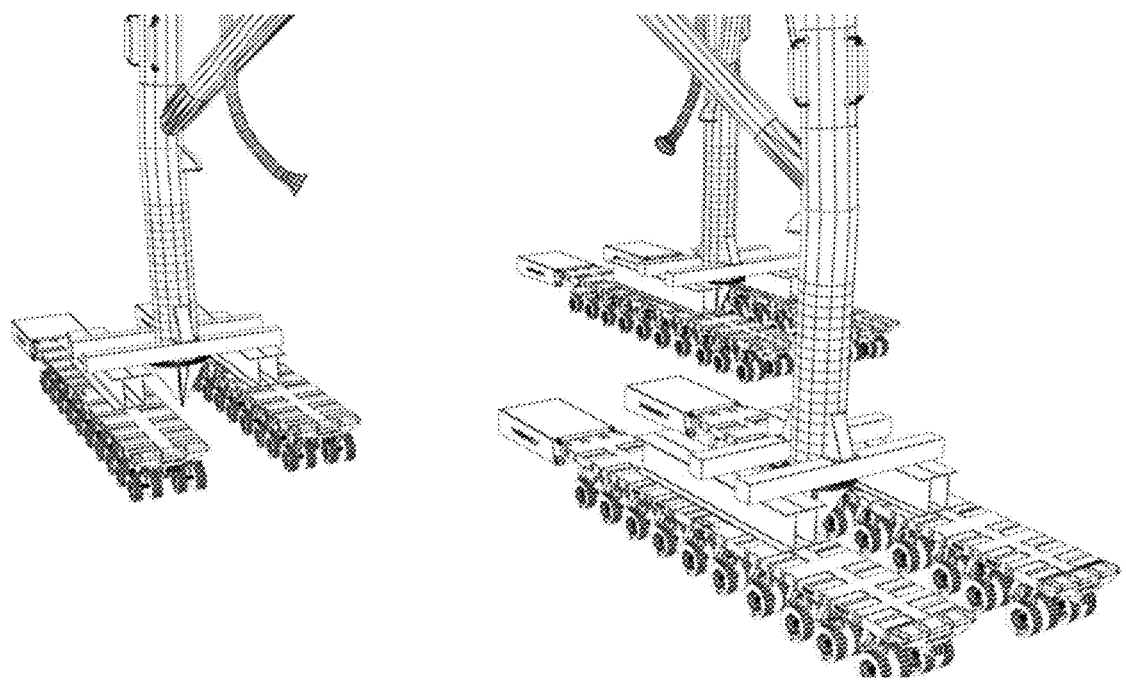
Figure 10E:
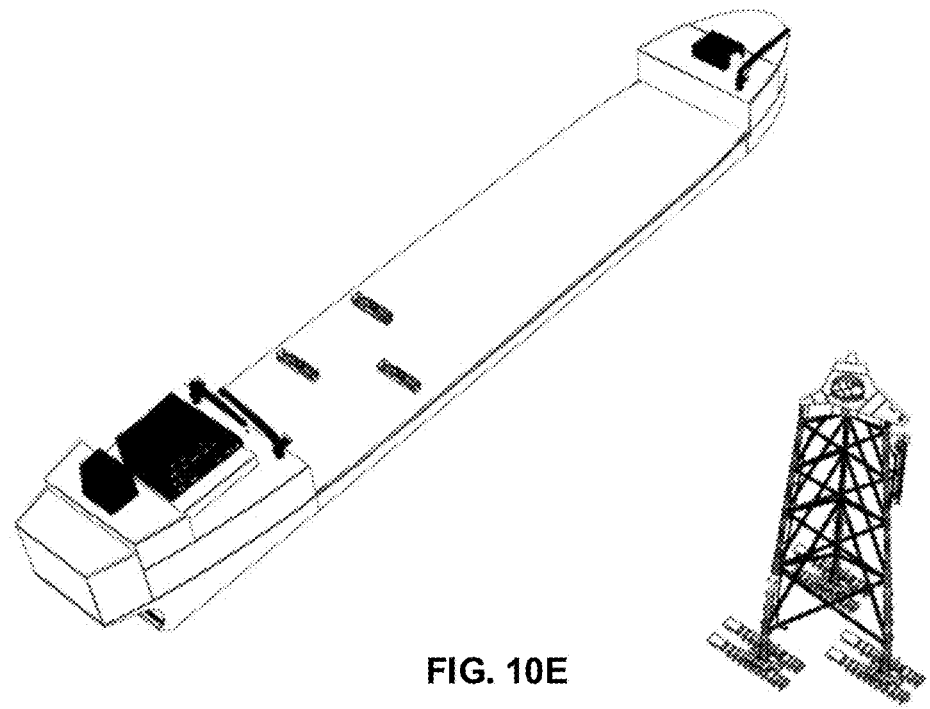

Once all legs are lifted so that they are no longer resting on the centre section of plate 16B of their corresponding concrete support structure 16, the plurality of SPMTs are then controlled to be moved in sync to move the jacket from the first substrate position. This is shown in FIG. 10D. In FIG. 10E, containerized grillages 100 are positioned on the surface of the vessel on which the jacket is to be loaded for transportation. The containerised grillages are positions to accommodate the spacing and positions of the legs 12 of the jacket structure. In this embodiment, as the jacket structure contains three legs 12, then three containerised grillages are used, as seen in FIG. 10E. It is to be understood that the number of containerised grillages as well as their configurations may vary depending on the configuration of the structure to be supported.

Figure 10F:
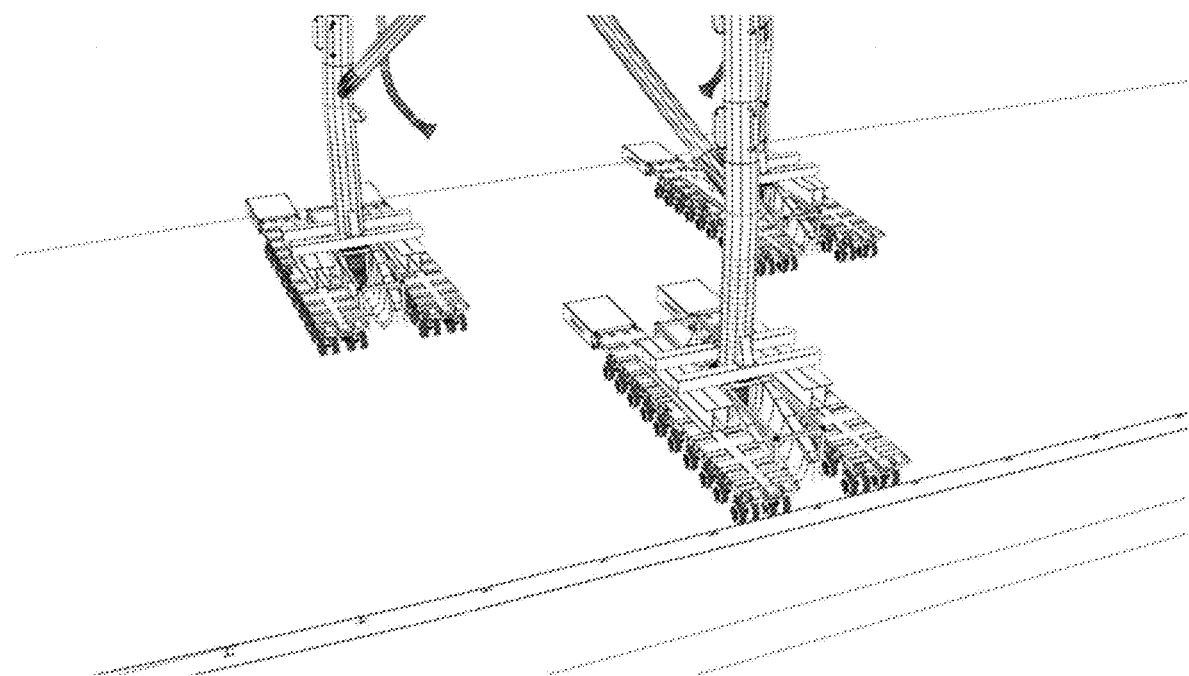
Figure 10G:
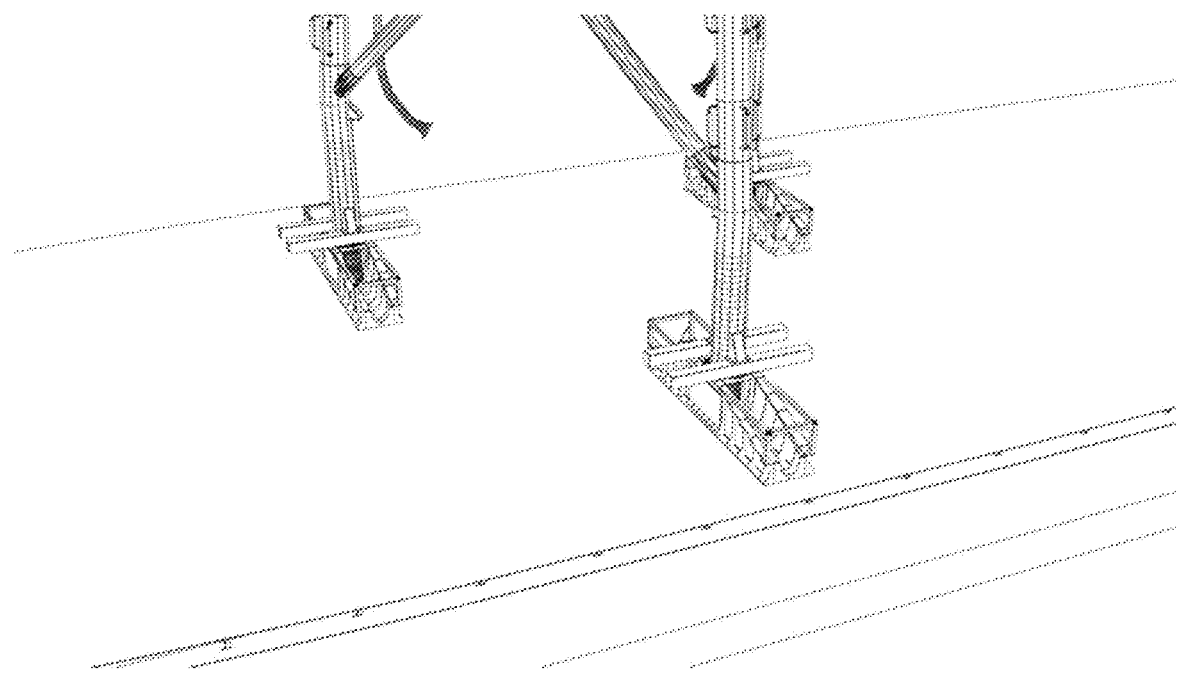
Figure 10H:
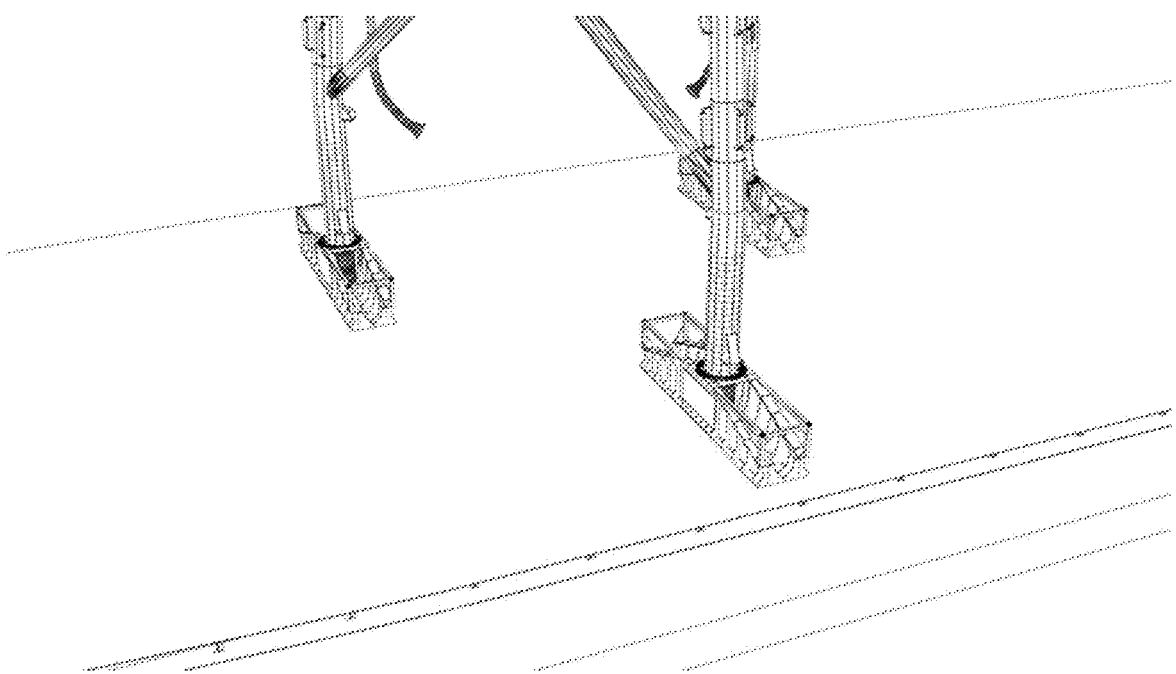

In FIG. 10F, the SPMTs are controlled to be moved in sync so that each SPMTs is aligned with its corresponding containerised grillage such that the direction of movement of the SPMT, and hence that of the male member of leg 12 of the jacket structure, would be along the longitudinal axis L of containerised grillage 100. It is to be noted that the SPMTs will be used to lift the load out beams far enough from the ground so that the plate 13 of leg 12 is raised above the top surface of containerised grillage 100. Once all the above is satisfied, gate 5A is opened according to any of the techniques described above to allow the male member of leg 12 to pass through gate 5A and through void 8A to be positioned in the central void section 9 of containerised grillage 100. At that point, the load spreading beam 20 is lowered until the plate 13 of leg 12 is rested on plate 10 of containerised grillage 100. FIG. 10G shows the next step, in which the SPMTs are controlled to be removed. In the next step shown in FIG. 10H, the load out beams are removed from each leg 12. Also, plate 13 of leg 12 and plate 10 of the containerised grillage are fixed to one another according to any of the techniques described above.

Figure 10I:
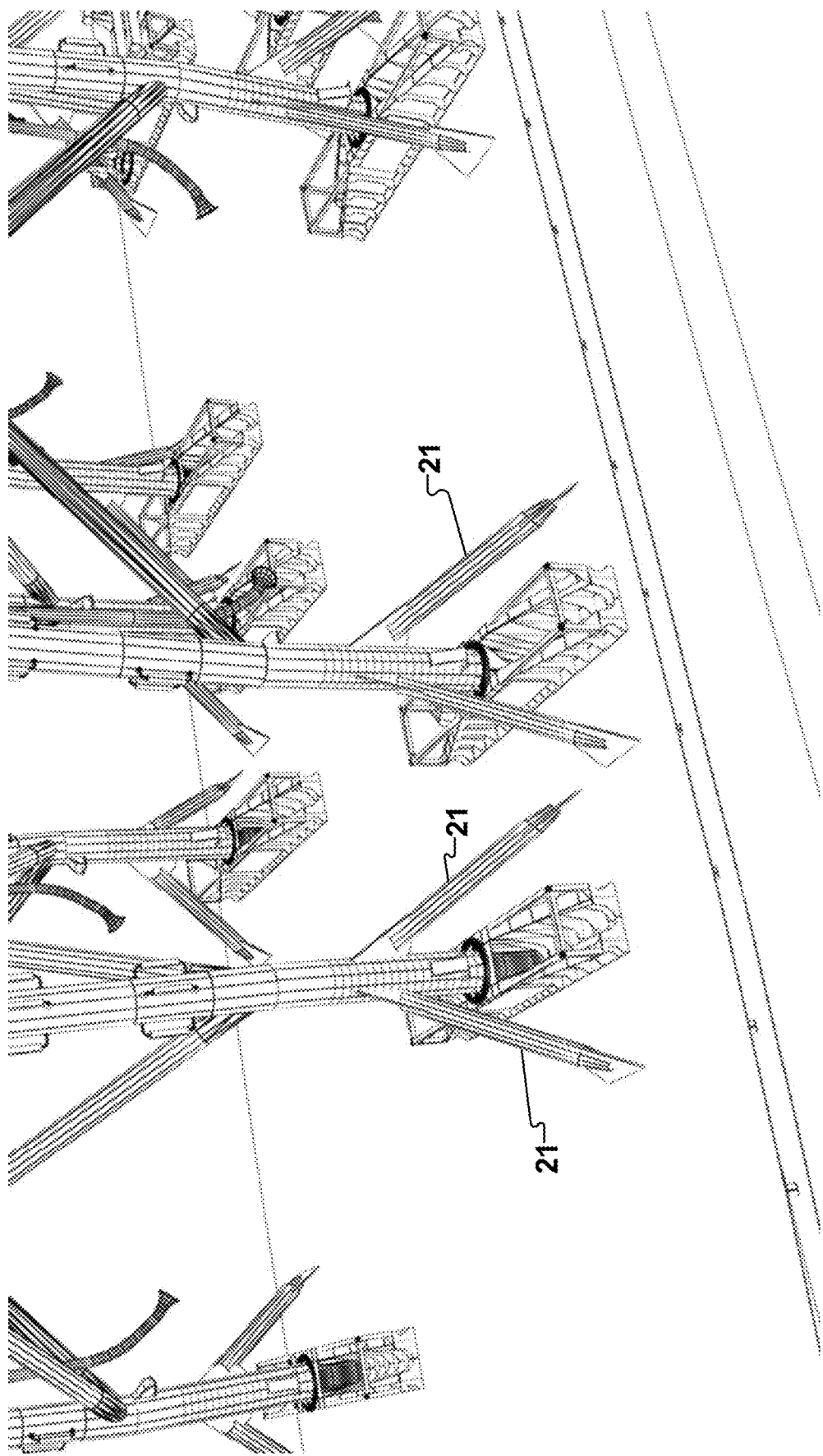

The final step is shown in FIG. 10I, in which gate 5A is closed to complete the framework 5 of the containerized grillage 100. Additionally, sea fasteners 21 are secured to each leg 12 of the jacket structure and to the deck of the vessel. The installation of sea fasteners allows for securing the jacket through its legs to the ship and to minimize horizontal movement of the jacket and its legs during transportation due to the various sea movements mentioned above. In this embodiment, sea fasteners 21 are shown to be in the form of steel pipes, but it is to be understood that other sea fastening designs and materials known in the art may be used to suit the ship, configuration and specification of the jacket in other embodiments.

In FIG. 10I, it is shown that multiple jackets are loaded on a deck of a single ship. This primarily is due to the substantial space saving caused by the use of the containerized grillages instead of grillages known in the art for receiving and securing legs of the jacket structure aboard a transporting vessel. It should be noted that the steps of offloading the jacket structure from the deck of the vessel and onto a fixed concrete support structure will follow the steps described above and illustrated in FIG. 10A to FIG. 10I in reverse order.

Also, it should be noted that with the jacket legs secured to the deck of the vessel by the sea fasteners and the containerised grillages, which are themselves secured to the deck of the ship by any means described above, this allows for safe and cost-effective way for transporting jackets from one location to another. Further, due to the containerized shape, external size and weight of the containerised grillages used, which conforms with ISO specifications for intermodal containers, as well as the ease of assembly and disassemble of such containerized grillages, this presents a substantial advantage of the ability to retrieve such containerised grillages as well as deploy them to other locations to be reused in a cost-effective manner. Additionally, due to the standard size and the use of adapters to fit different size jacket legs designed for different purposes, the universal nature of the containerised grillages allows them to be reused for transporting any jacket structure type without being constrained to a specific jacket type.

Figure 11:
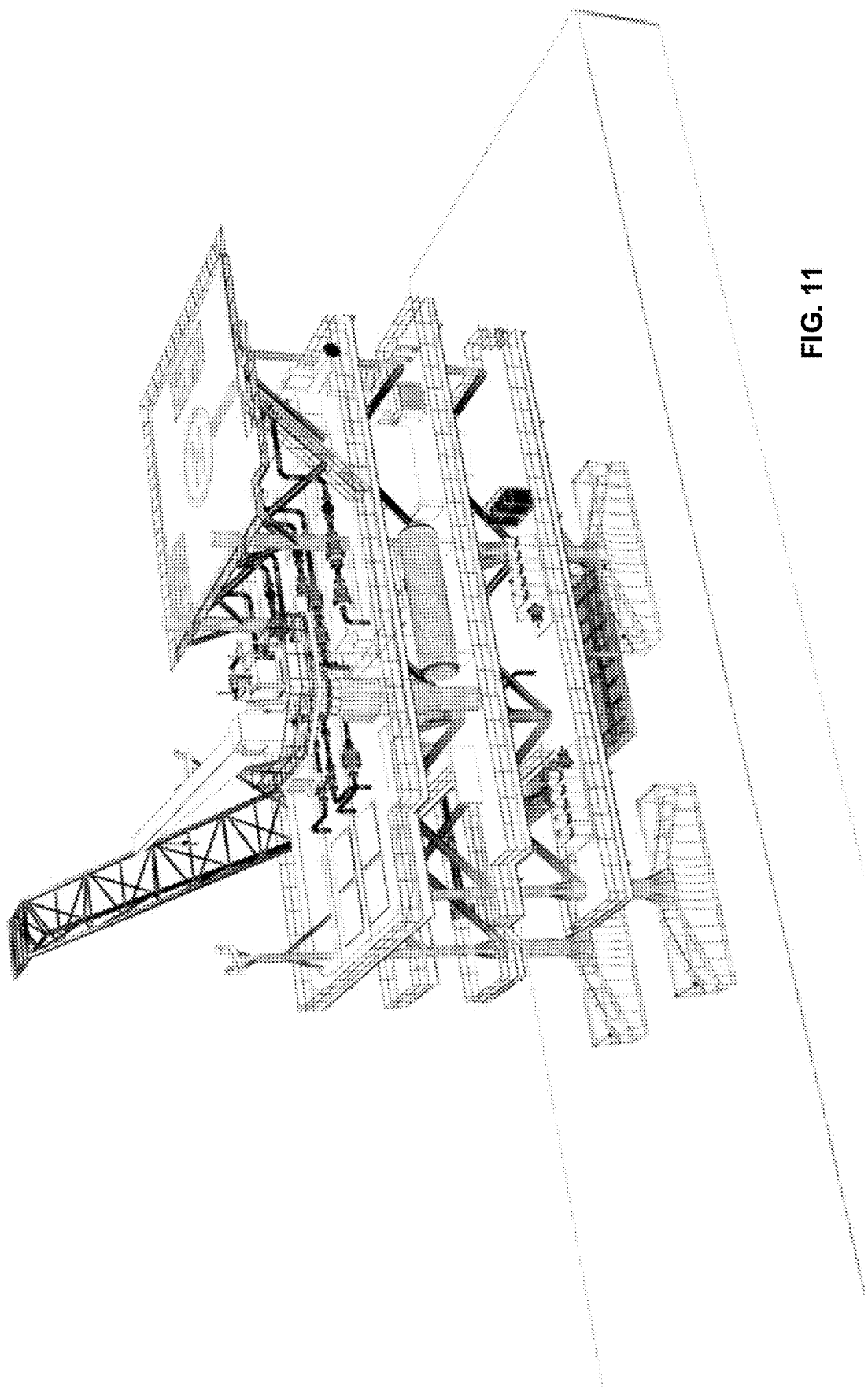
FIG. 11 shows multiple grillages as shown in FIG. 1A in use for supporting a deck loadout according an exemplary embodiment of the invention.
Figure 11A:
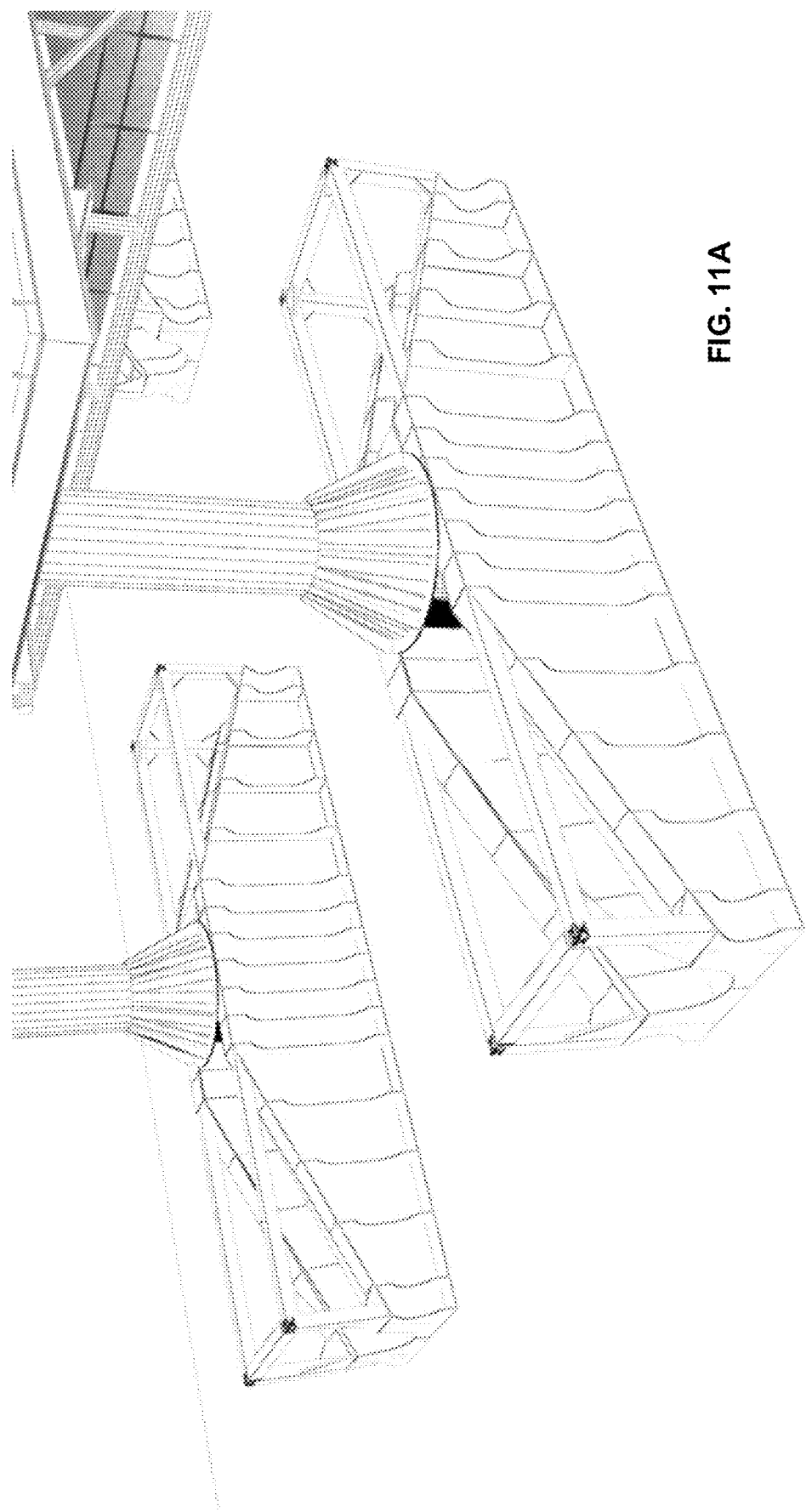
FIG. 11A shows a closeup perspective view of a couple of grillages supporting the deck loadout shown in FIG. 11.

FIG. 11 shows multiple grillage in use for supporting an exemplary deck loadout. As shown in FIG. 11A, in this exemplary embodiment, each of the vertical support beams of the deck loadout are mounted on its corresponding grillage, which is configured to have an adapter similar to the one presented in FIG. 1A.

Figure 12:
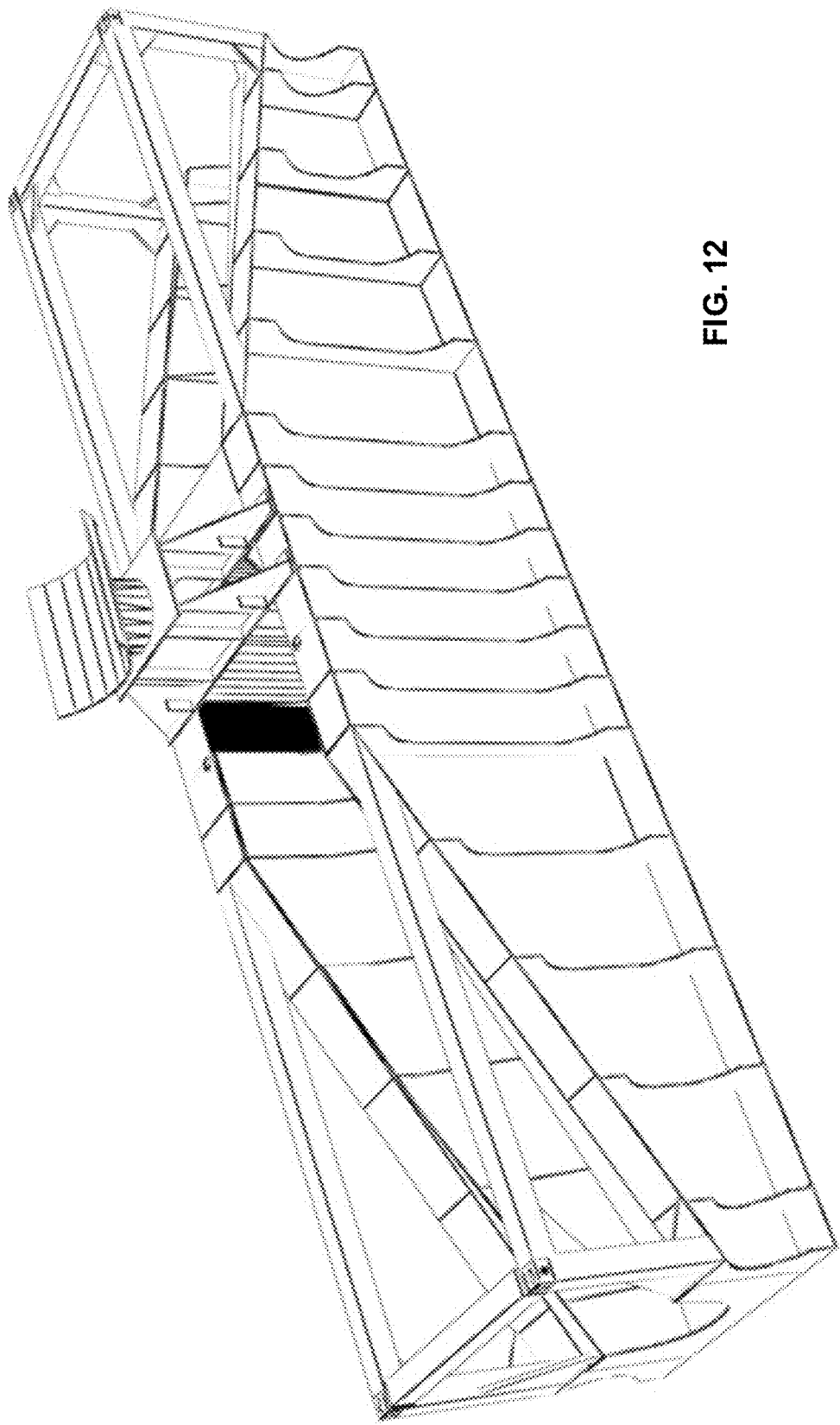
FIG. 12 shows a perspective view of a grillage having an adapter for receiving a section of a horizontal oriented object.
Figure 12A:
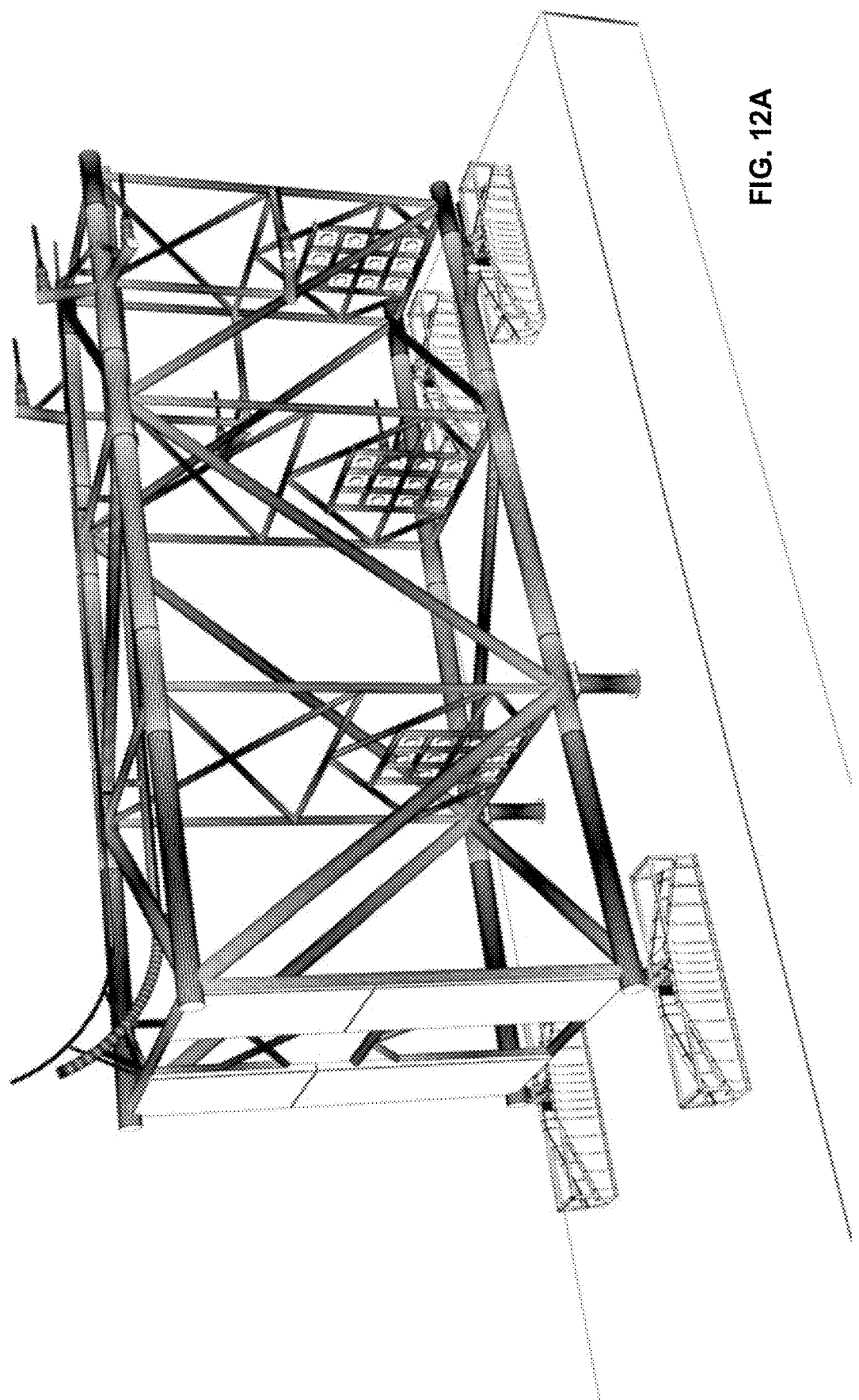
FIG. 12A shows a perspective view of multiple grillages as the one shown in FIG. 12 in use for supporting a jacket loadout structure according to an exemplary embodiment of the invention.
Figure 12B:
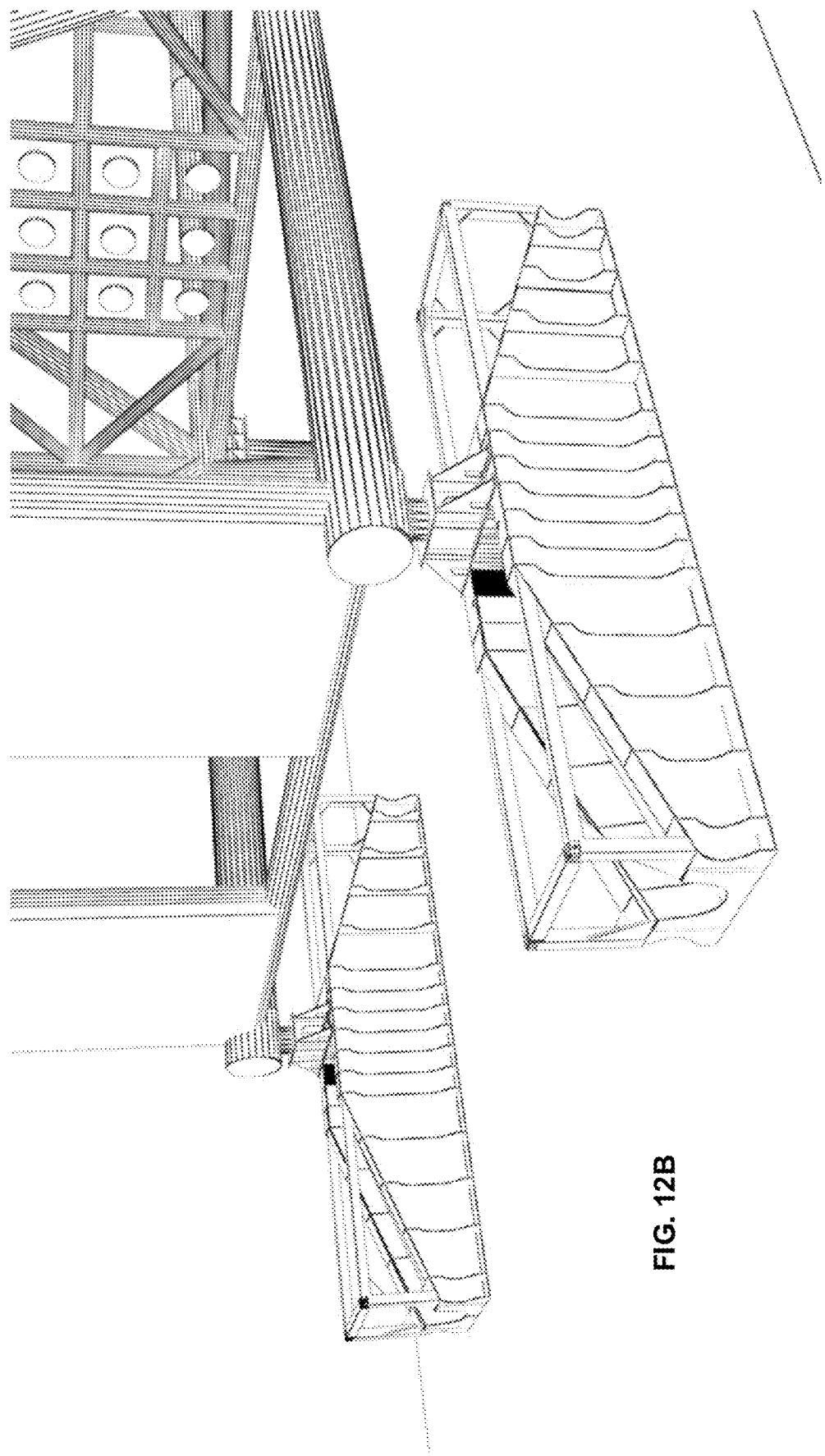
FIG. 12B shows a closeup perspective view of a couple of the grillages supporting the structure shown in FIG. 12A.

While the adapter shown in FIG. 11 is configured for receiving a leg (beam) in a vertical orientation and thereby supporting the weight of an object through legs erecting from the object, it is to be understood that different adapters may be used to provide weight support and distribution in a different manner. For example, FIG. 12 show a grillage adapter configured for receiving load that may be oriented horizontally. FIG. 12A and FIG. 12B show the grillage and adapter shown in FIG. 12 in use, where in this exemplary embodiment, the adapter is shown to support a section of a horizonal beam, that forms part of a base for a jacket loadout having two base beams. For each of the two beams, two grillages are shown to support the weight of the beam and the rest of the structure. The two grillages are positioned at each end of the beam along its longitudinal axis. In the exemplary embodiment shown in FIG. 12, in addition to the grillages, additional support structures are used along the length of the beam. However, in other embodiments, instead of such vertical support structures or in addition to them, more than two grillages may be used and placed at different positions to balance the beam and allow for weight distribution of the beam and the structure.

Interpretation of Terms

Unless the context clearly requires otherwise, throughout the description and the claims:
"comprise," "comprising," and the like are to be construed in an inclusive sense, as opposed to an exclusive or exhaustive sense; that is to say, in the sense of "including, but not limited to".
"connected," "coupled," or any variant thereof, means any connection or coupling, either direct or indirect, between two or more elements; the coupling or connection between the elements can be physical, logical, or a combination thereof.
"herein," "above," "below," and words of similar import, when used to describe this specification shall refer to this specification as a whole and not to any particular portions of this specification.
"or," in reference to a list of two or more items, covers all of the following interpretations of the word: any of the items in the list, all of the items in the list, and any combination of the items in the list.
the singular forms "a", "an" and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", "upper", "lower" and the like, used in this description and any accompanying claims (where present) depend on the specific orientation of the apparatus described and illustrated. The subject matter described herein may assume various alternative orientations. Accordingly, these directional terms are not strictly defined and should not be interpreted narrowly.

Where a component (e.g. module, assembly, device, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of device and method have been described herein for purposes of illustration. These are only examples. The technology provided herein can be applied to device and method other than the examples described above. Many alterations, modifications, additions, omissions and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

It is therefore intended that the following appended claims and claims hereafter introduced are interpreted to include all such modifications, permutations, additions, omissions and sub-combinations as may reasonably be inferred. The scope of the claims should not be limited by the preferred embodiments set forth in the examples, but should be given the broadest interpretation consistent with the description as a whole.

What is claimed is:

1. A portable grillage for receiving and supporting a heavy load in a stationary position or during transportation, the grillage comprising:
   a base;
   a load bearing structure coupled to the base, the load bearing structure for supporting the heavy load;
   a framework attached to the load bearing structure;
   wherein the load bearing structure comprises a plurality of plates configured to be substantially parallel and spaced apart from one another along a longitudinal direction of the grillage;

wherein the plurality of plates is oriented to be substantially orthogonal to the base and facing the longitudinal direction of the grillage;

wherein a connecting structure is provided for connecting the plurality of plates to form a unitary structure;

wherein each plate of the plurality of plates includes a recess such that in a vertical configuration the recess in the plurality of plates forms a hollow structure extending along the longitudinal direction of the load bearing structure from a side along its longitudinal direction to a center section of the load bearing structure; and wherein the hollow structure is dimensioned to allow a male end member of a leg of a jacket structure to pass from the side of the grillage along its longitudinal direction and be received at the center section of the load bearing structure.

2. The grillage according to claim 1 wherein the grillage further comprises a horizontal plate resting on and fixed to part of the plurality of plates forming the center section, the horizontal plate oriented to be parallel to the base, the horizontal plate having a recess facing the side of the grillage along its longitudinal direction, the recess of the horizontal plate allowing the male end member of the leg of the jacket structure to be received and releasably secured at the center section of the load bearing structure.

3. The grillage according to claim 1 wherein the grillage further comprises an adapter releasably secured to the grillage, the adapter for adapting different sized jacket structures to be supported by the grillage.

4. The grillage according to claim 1 wherein the each of the plurality of plates are of different sizes such that each of the plurality of plates have heights that taper from the center section to the side of the load bearing structure along its longitudinal direction.

5. The grillage according to claim 1 wherein the grillage is transportable using standard container shipping means in at least one of vertical or horizontal stackable configuration of multiple grillages.

6. The grillage according to claim 5 wherein the grillage further includes corner blocks on each of its corners, the corner blocks configured for releasably securing the grillage to a deck of a vessel and/or to one or more adjacent stacked grillages and/or stacked containers during transportation thereof.

7. A method of making a grillage comprising:
providing metallic plates;
configuring and orienting the metallic plates and assembling the metallic plates together such that the metallic plates form an elongated structure having a base, and a load bearing structure, the method further comprising coupling the load bearing structure to the base for supporting a heavy load;
providing a framework comprising additional metallic plates or beams and attaching the framework to the load bearing structure;
cutting the metallic plates such that the plates have different sizes and different recess sizes, such that when the plates are assembled, the elongated structure formed by the assembled plates will have a central section taller in vertical height than either end of the assembled structure along its longitudinal axis and the height of the assembled structure from the plate is tapered from the central section to the either end of the assembled structure along its longitudinal axis; and resting a horizontal plate on and fixing the horizontal plate to part of the plurality of plates forming the center section, the horizontal plate oriented to be parallel to a base.

8. The method of making a grillage according to claim 7 wherein the base and horizontal plate are oriented orthogonal to the plurality of plates.

9. The method of making a grillage according to claim 7 wherein the hollow structure is dimensioned to allow a male end member of a leg of a jacket structure to pass from the side of the grillage along its longitudinal direction and be received at the center section of the elongated structure.

10. The method of making a grillage according to claim 7 further comprising releasably securing an adapter to the grillage, the adapter for adapting different sized jacket structures to be supported by the grillage.

11. The method of making a grillage according to claim 7 further comprising coupling corner blocks to each corner of the grillage, the corner blocks configured for releasably securing the grillage to a deck of a vessel and/or to one or more adjacent stacked grillages and/or containers during transportation thereof.

12. A method of using a re-usable and portable grillage for transporting a heavy load on a vessel, the method comprising:
providing a plurality of grillages as claimed in claim 1, the plurality of the grillages corresponding to a number of legs for the heavy load to be supported, configuring and positioning the plurality of grillages on a deck of the vessel to correspond to a spacing and configuration of the legs for the heavy load to be supported,
releasably securing the grillages to the deck of the vessel;
loading each leg of the number of legs onto a centre section of a corresponding grillage; and releasably securing the legs onto their corresponding grillage.

13. The method according to claim 12 further comprising using the plurality of grillages for transporting a second heavy load, the second heavy load being different from the heavy load in shape, weight and size by fitting one of the grillage and legs of the second heavy load with an adapter configured for releasably securing the legs of the heavy load to the associated grillage.

14. The method according to claim 12 further comprising disassembling the grillages after use and shipping them in a cost-effective stacked configuration using standard size container shipping means.

15. The method according to claim 14 further comprising securing the stacked configuration of the grillages to one another by using twist locks at a corner block mounted on at least one corner of the grillages.

16. The grillage according to claim 1 wherein the base, the load bearing structure, and the framework forming the grillage has combined external dimensions which correspond with external dimensions of an intermodal container thereby rendering the grillage transportable as an intermodal container; and
wherein the grillage is re-suable.

17. A method of making a grillage as claimed in claim 7, wherein the base, the load bearing structure and the framework forming the grillage are provided such that the combined external dimensions thereof correspond with external dimensions of an intermodal container thereby rendering the grillage transportable as an intermodal container.

* * * * *